US007616182B2

(12) United States Patent
Iwabuchi

(10) Patent No.: US 7,616,182 B2
(45) Date of Patent: Nov. 10, 2009

(54) DISPLAY DEVICE AND DRIVING METHOD THEREOF

(75) Inventor: Tomoyuki Iwabuchi, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 727 days.

(21) Appl. No.: 11/269,721

(22) Filed: Nov. 9, 2005

(65) Prior Publication Data

US 2006/0109229 A1 May 25, 2006

(30) Foreign Application Priority Data

Nov. 24, 2004 (JP) ............................ 2004-339612

(51) Int. Cl.
*G09G 3/36* (2006.01)
*G06F 3/038* (2006.01)

(52) U.S. Cl. .......................... 345/100; 345/98; 345/204

(58) Field of Classification Search ........... 345/55–100, 345/204–214, 690–697
See application file for complete search history.

(56) References Cited

U.S. PATENT DOCUMENTS

| | | | | |
|---|---|---|---|---|
| 6,774,574 | B1 | 8/2004 | Koyama | |
| 6,777,887 | B2 | 8/2004 | Koyama | |
| 7,075,342 | B2 * | 7/2006 | Nishimura | 327/108 |
| 7,193,594 | B1 * | 3/2007 | Yamazaki et al. | 345/89 |
| 2001/0022565 | A1 * | 9/2001 | Kimura | 345/82 |
| 2002/0153844 | A1 | 10/2002 | Koyama | |
| 2004/0017341 | A1 * | 1/2004 | Maki | 345/87 |
| 2004/0207331 | A1 | 10/2004 | Koyama | |
| 2004/0227749 | A1 | 11/2004 | Kimura | |
| 2005/0007181 | A1 | 1/2005 | Kimura | |
| 2005/0110738 | A1 * | 5/2005 | Kim et al. | 345/100 |
| 2005/0127820 | A1 | 6/2005 | Yamazaki et al. | |
| 2005/0140265 | A1 | 6/2005 | Hirakata | |
| 2005/0197030 | A1 | 9/2005 | Yamazaki et al. | |
| 2006/0071893 | A1 * | 4/2006 | Nishina et al. | 345/89 |

FOREIGN PATENT DOCUMENTS

| | | |
|---|---|---|
| JP | 10-133174 | 5/1998 |
| JP | 2001-005426 | 1/2001 |
| JP | 2004-354758 | 12/2004 |

* cited by examiner

*Primary Examiner*—David L Lewis
(74) *Attorney, Agent, or Firm*—Fish & Richardson P.C.

(57) ABSTRACT

A low-power-consumption active matrix display device is provided.

A driving method of an active matrix display device having M gate lines and N source lines, comprises the steps of writing a data signal of an (m−1)-th row (2≦m≦M, m is a natural number) to the source line, comparing a data signal of an m-th row with the data signal of the (m−1)-th row before the data signal of the m-th row is input to the source line, electrically disconnecting source lines to which a data signal of the m-th row is input from a power source circuit in the case where the data signal of the m-th row is different from the data signal of the (m−1)-th row, electrically connecting source lines of which a data signal of the m-th row is different from a data signal of the (m−1)-th row out of the N source lines to one another, and electrically disconnecting the connected source lines respectively and connecting them to the power source circuit so that the data signal of the m-th row is written to the source line.

34 Claims, 17 Drawing Sheets

DISPLAY DEVICE AND DRIVING METHOD THEREOF

BACKGROUND OF THE INVENTION

1. Field of the Invention

The present invention relates to a display device having a light-emitting element, a liquid crystal element and the like, and a driving method thereof.

2. Description of the Related Art

With respect to a flat panel display device which is widely used for a display portion of a portable information terminal as well as medium and large sized devices in recent years, the number of pixels has increased as the display device has been highly defined. Therefore, it is necessary that video signals can be written into each pixel taking enough time by a line sequential driving method in which data is simultaneously written (input) to each row of active matrix pixels each of which can hold image data, even if the number of pixels is large.

A gray-scale system of a display device having active matrix pixels is broadly categorized into an analog gray-scale system and a digital gray-scale system. Between the two, the digital gray-scale system includes a time division gray-scale system, an area gray-scale system, and a combined system of the two systems. In any of the digital gray-scale systems, each pixel or sub pixel is driven with a binary value of an on state or an off state. Therefore, the digital gray-scale system has an advantage in that image quality is prevented from being deteriorated by variation of Vth of TFTs in comparison with the analog gray-scale system. Note that Japanese Patent Laid-Open No. 2001-5426 also discloses a gray-scale display using the digital time division system.

FIG. 5 shows a configuration example of a digital gray-scale display device for inputting data having a binary values into active matrix pixels by a line sequential system. A pixel portion has M rows and N columns of pixels (M and N are natural numbers respectively). Around a pixel portion 501, a source line driver circuit 502 having a shift register 504, a first latch circuit 505, a second latch circuit 506, a level shifter 507 and a buffer 508, and a gate line driver circuit 503 having a shift register 509, a level shifter 510 and a buffer 511 are arranged.

The shift register 509 outputs selective pulses sequentially from a first stage in accordance with clock signals (GCK) and start pulses (GSP). After that, the level shifter 510 converts the amplitude of the selection pulses, and the buffer 511 selects gate lines sequentially from a first row to m-th row and then to M-th row (2≦m≦M, m is a natural number).

At a row of which a gate line is selected, the shift register 504 outputs sampling pulses sequentially from a first stage in accordance with clock signals (SCK) and start pulses (SSP). The first latch circuit 505 samples video signals (Video) at the timing when sampling pulses are input, and the video signals sampled on each stage are held in the first latch circuit 505.

As a latch pulse (LAT) is input after video signals of one row are completely sampled, the video signals held in the first latch circuit 505 are transferred to the second latch circuit 506 all at once so that all source lines are charged and discharged all at once. Accordingly, when a latch pulse (LAT) is input after video signals of the m-th row are completely sampled, the video signals held in the first latch circuit 505 are transferred to the second latch circuit 506 all at once so that all source lines are charged and discharged all at once through the level shifter 507 and the buffer 508.

The abovementioned operations are repeated from the first row to the last row (here, the M-th row) so that writing into all pixels is completed. In addition, similar operations are repeated to display video.

In the case of the analog gray-scale system, if data is input to a source line at least once in each frame, gray-scale display is enabled.

On the other hand, in the case where the digital gray-scale system is used by which each pixel is driven with a binary value of an on state and an off state, such as the time gray-scale system, the area gray-scale system, or the combination of the time and area gray-scale systems, data is required to be input to a source line a plurality of times in each frame in order to perform gray-scale display. In a display device, a plurality of TFTs provided in a pixel portion and parasitic capacitance is load capacitance to a source line connected to a buffer circuit. In the case of a digital gray-scale system, when data input into a source line changes from a low potential ((m−1)-th row) to a high potential (m-th row), an external positive power source charges the load capacitance until it reaches from the low potential ((m−1)-th row) to the high potential (m-th row) through p-channel TFTs of the buffer. On the contrary, when data input into a source line changes from a high potential ((m−1)-th row) to a low potential (m-th row), an external negative power source discharges the load capacitance until it reaches from the high potential to the low potential through n-channel TFTs of the buffer. The electric power is consumed when an electric potential of a source line changes; therefore, if an output often changes, more electric power of the external power source is consumed. Therefore, in the case of the digital gray-scale system, power consumption of the external power source increases in order to display an image such as a natural picture which requires a number of gray scales or a specific pattern in which logic is frequently inverted, because a voltage is changed many times upon data input into a source line.

Therefore, in the case of the digital gray-scale system, power consumption required for inputting data into a source line is a big problem for a small sized display device of a portable terminal which requires low power consumption. Further, with respect to display devises such as a television, it is difficult to prevent an increase of parasitic capacitance of a source line in accordance with the increase in size of the display devices. Therefore, it requires lower power consumption similarly to a small-sized display device.

SUMMARY OF THE INVENTION

In view of the foregoing, the present invention provides a display device and a driving method thereof using a digital time gray-scale system by which reduction of power consumption of a power source required for charging and discharging a source line is realized.

In order to solve the abovementioned problems, the invention takes the following measures.

The display device of the invention has M rows and N columns (M and N are natural numbers respectively) of pixels; M gate lines; N source lines, a circuit for storing a data signal of an (m−1)-th row (2≦m≦M, m is a natural number); a circuit for comparing a data signal of an m-th row with the data signal of the (m−1)-th row before the data signal of the m-th row is input to the source line; a switch for electrically connecting the source lines to a power source circuit; and a switch for electrically connecting the N source lines to one another.

In an active matrix display device having M rows and N columns (M and N are natural numbers respectively) of pixels, M gate lines, and N source lines, a data signal of an (m−1)-th row (2≦m≦M, m is a natural number) is input to a source line; the source line is electrically disconnected from a power source circuit; a data signal of an m-th row is compared with the data signal of the (m−1)-th row before the data signal of the m-th row is input to the source line; out of N source lines, source lines of which a data signal of the m-th row is different from a data signal of the (m−1)-th row are electrically connected to one another; and each of the connected sources lines is electrically disconnected and electrically connected to a power source circuit so that the data signal of the m-th row is input to the source line.

Further, in an active matrix display device having M rows and N columns (M and N are natural numbers respectively) of pixels, M gate lines, and N source lines, a data signal of a (m−1)-th row (2≦m≦M, m is a natural number) is input to a source line; a data signal of a m-th row is compared with the data signal of the (m−1)-th row before the data signal of the m-th row is input to the source line; in the case where the data signal of the m-th row is different from that of the (m−1)-th row, a source line to which the data signal of the m-th row is input is electrically disconnected from a power source circuit; out of N source lines, source lines of which a data signal of the m-th row is different from a data signal of the (m−1)-th row are electrically connected to one another; and each of the connected source lines is electrically disconnected and electrically connected to a power source circuit so that the data signal of the m-th row is input to the source line.

A step in which a data signal of the (m−1)-th row (2≦m≦M, m is a natural number) is stored before data signals are compared with one another and the data signal of the (m−1)-th row is input to a source line may be provided. Further, the invention is applied to a line sequential driving. An exclusive disjunction circuit can be used for comparing. Furthermore, the source line may be connected to a power source circuit through a buffer circuit.

Further, in a pixel portion, a TFT, a pixel electrode, a light-emitting element, and a liquid crystal element or the like are provided at an intersection of a gate line and a source line.

In a display device having M rows and N columns (M and N are natural numbers respectively) of active matrix pixels, M gate lines, and N source lines; in which data is input by a line sequential system and a digital gray-scale driving is performed, data having a binary value is input to each source line row by row, as mentioned above. In the period after the data input of the previous row ((m−1)-th row, 2≦m≦M, m is a natural number) is completed but before the data input of the present row (m-th row) is carried out, source lines of which data on the previous row ((m−1)-th row) is different from data on the present row (m-th row) are electrically disconnected from an external power source and the source lines of which data on the previous row ((m−1)-th row) is different from data on the present row (m-th row) are connected to one another.

By the abovementioned constitution, out of source lines of which data on the previous row ((m−1)-th row) is different from data on the present row (m-th row), charge move from the load capacitance of a source line of which data on the previous row ((m−1)-th row) has been at high potential into the load capacitance of a source line of which data on the previous row ((m−1)-th row) has been at low potential until each potential reaches the same level, namely, middle potential. Since the source lines and an external power source are electrically disconnected at this time, the external power source does not consume electric power for charging and discharging up to the middle potential. Further, the middle potential at this time is ideally determined by the ratio of the number of source lines of which data on the previous row ((m−1)-th row) is at high potential and of which data on the present row (m-th row) is at low potential to the number of source lines of which data on the previous row ((m−1)-th row) is at low potential and of which data on the present row (m-th row) is at high potential.

Data on the present row (m-th row) is input after source lines of which data on the previous row ((m−1)-th row) is different from data on the present row (m-th row) is charged and discharged up to middle potential. At this time, the external power source may only carry out charging and discharging from the middle potential to high potential or low potential. Therefore, data of a source line can be rewritten with less electric power than that used in a conventional device.

By the invention, in the period after the data input of the previous row ((m−1)-th row) is completed but before the data input of the present row (m-th row) is carried out, out of source lines of which data on the previous row ((m−1)-th row) is different from data on the present row (m-th row), charge move from the load capacitance of a source line of which data on the previous row ((m−1)-th row) has been at high potential into the load capacitance of a source line of which data on the previous row ((m−1)-th row) has been at low potential until each potential reaches the same level, namely, middle potential. Since the source lines and an external power source are electrically disconnected at this time, the external power source does not consume electric power for charging and discharging up to the middle potential. After that, in an m-th row data inputting period, the external power source may only carry out charging and discharging from the middle potential to high potential or low potential. Therefore, data of a source line can be rewritten with less electric power than that used in a conventional device.

Although the conventional display device consumes much electric power for displaying an image such as a natural picture which requires a number of gray scales and a specific pattern of which logics is frequently inverted row by row, such an image and pattern can be displayed with small electric power by a display device and a driving method of the invention, which are constituted as described above, since the external power source does not consume electric power for charging and discharging up to middle potential.

DETAILED DESCRIPTION OF THE INVENTION

Figure 1:
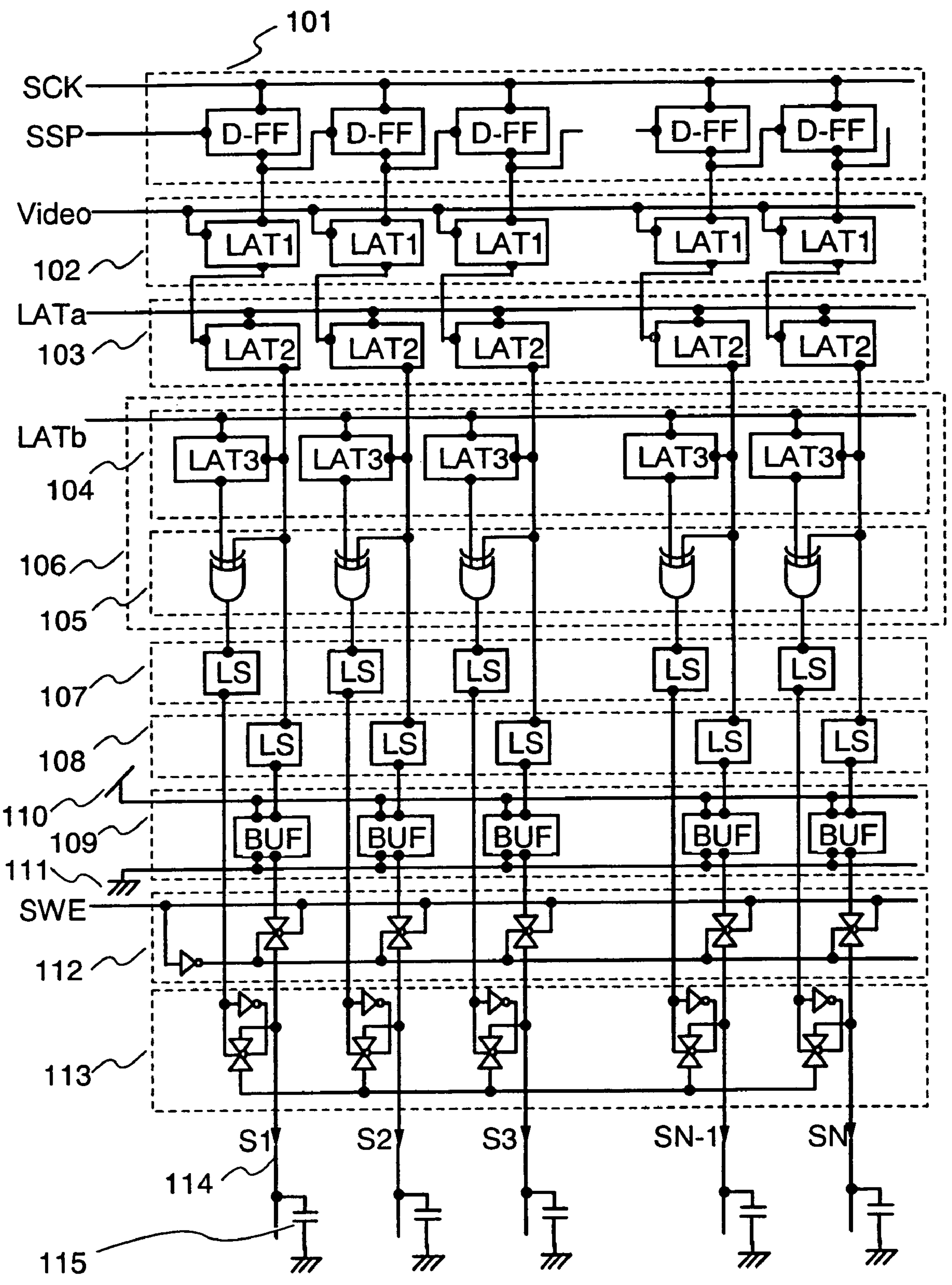
FIG. 1 is a circuit diagram of one embodiment mode of the invention.

Although the present invention will be fully described by way of embodiment modes and embodiments with reference to the accompanying drawings, it is to be understood that various changes and modifications will be apparent to those skilled in the art. Therefore, unless otherwise such changes and modifications depart from the scope of the present invention, they should be construed as being included therein. Among all the drawings, common portions are denoted by common reference numerals, and they will be described in no more detail.

Embodiment Mode 1

FIG. 1 shows a block diagram of a line sequential system source line driver circuit of a display device which is used for a display device of the invention. The line sequential system source line driver circuit has a shift register 101, a first latch circuit 102, a second latch circuit 103, a second level shifter circuit 108 and a buffer circuit 109 similarly to a conventional line sequential system source line driver circuit shown in FIG. 5. Further, although not shown, the display device of the invention has M rows and N columns of pixels, M gate lines and N source lines in a pixel portion. Furthermore, the display device of the invention also has a gate line driver circuit including a shift register, a level shifter and a buffer. In addition, a TFT, a pixel electrode and a light-emitting element or a liquid crystal element are provided at an intersection of the gate lines and the source lines in the pixel portion.

Output terminals of the second latch circuit 103 are connected to a third latch circuit 104 and an exclusive disjunction (also referred to as an exclusive OR or an XOR, and hereinafter referred to as an exclusive disjunction) circuit 105 in addition to the second level shifter circuit 108. Output terminals of the third latch circuit 104 are connected to the exclusive disjunction circuit 105. Output terminals of the exclusive disjunction circuit 105 are connected to a first level shifter circuit 107. Output terminals of the first level shifter circuit 107 are connected to n-channel TFT side gate terminals of a second transmission gate 113. Output terminals of the buffer circuit 109 are electrically connected to a source line 114 through a first transmission gate 112. That is, the first transmission gate 112 has a function of a switch for electrically connecting the source line 114 to the buffer circuit 109. The buffer circuit 109 is connected to a positive power source 110 and a negative power source 111 which are external power source circuits. The first transmission gate 112 connects or disconnects the buffer circuit 109 and/from the source line 114 and cut them off in accordance with a SWE signal. The SWE signal is input to p-channel TFT side gate terminals of the first transmission gate 112. Each source line 114 (S1, S2, S3, . . . , Sn−1, Sn) is connected to one another through the second transmission gate 113. That is, the second transmission gate 113 has a function of a switch for electrically connecting the source lines to one another.

Note that, although an exclusive disjunction circuit and transmission gates are used here, the invention is not limited to them. Any circuits having a comparing function and a switching function may be used.

Figure 2:
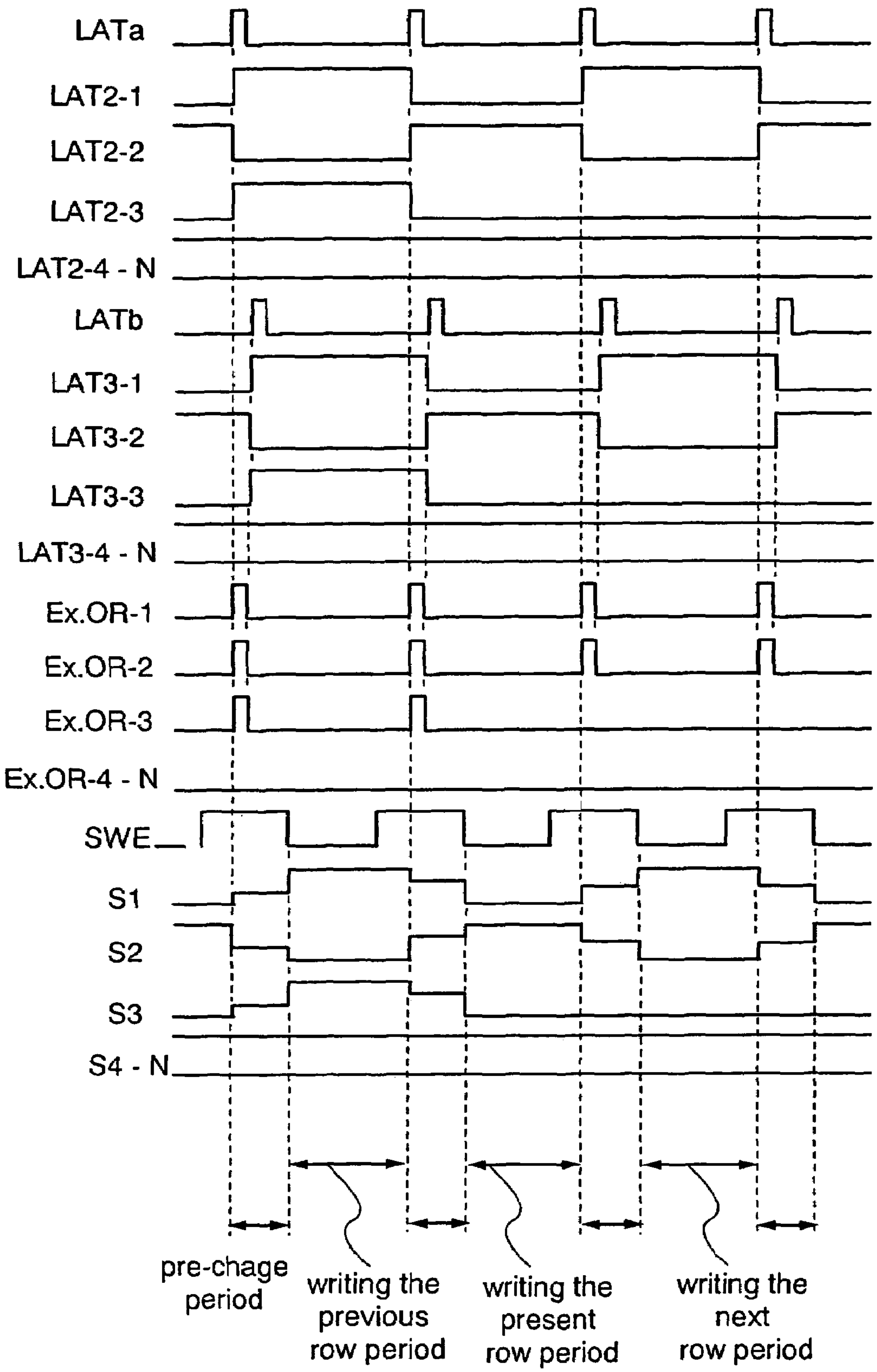
FIG. 2 is a timing chart of one embodiment mode of the invention.
Figure 5:
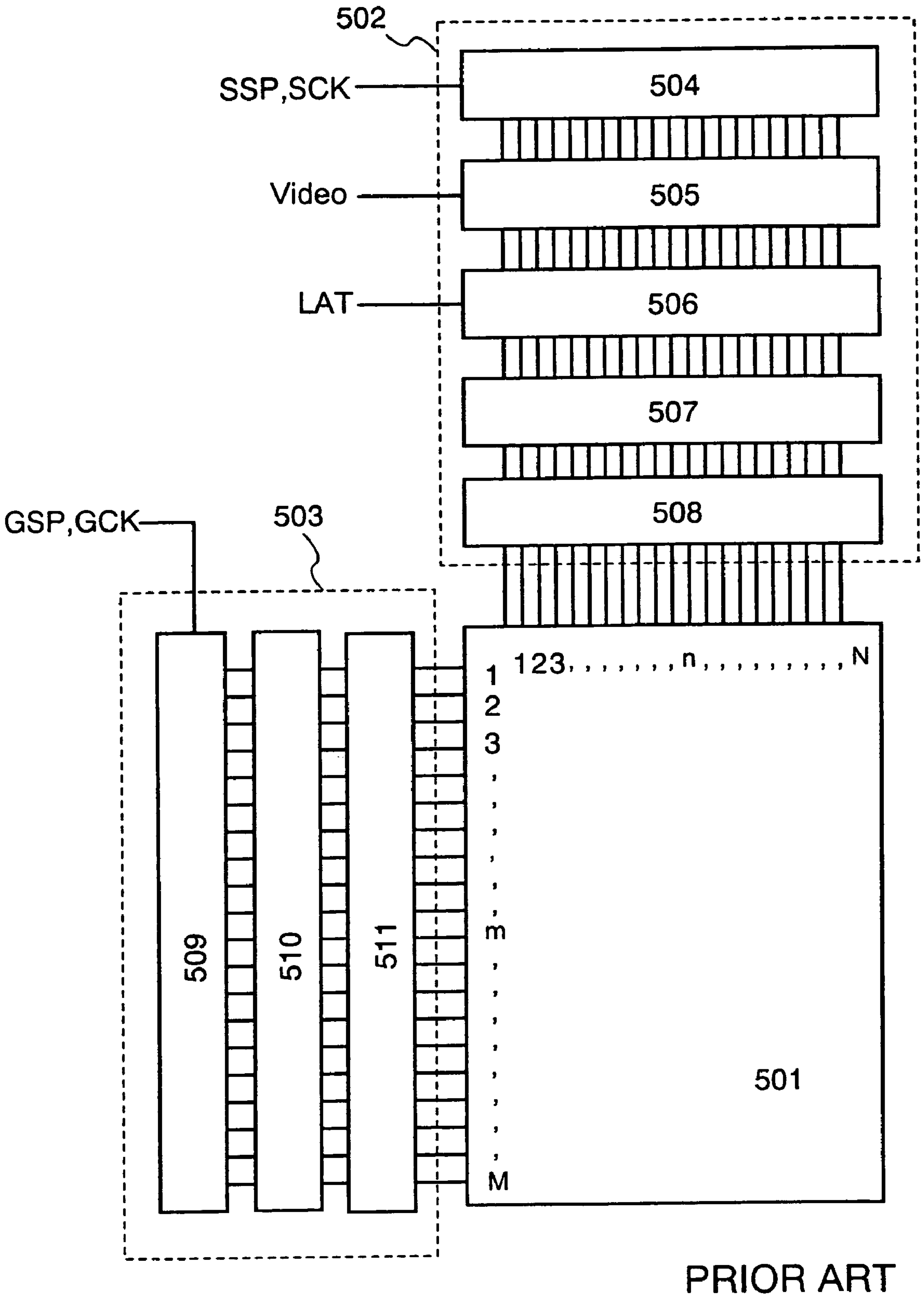
PRIOR ART FIG. 5
FIG. 5 is a diagram showing a configuration of a conventional line sequential system display device.

Descriptions are given on operations of the source line driver circuit. First, the shift register 101, the first latch circuit 102, the second latch circuit 103, the second level shifter circuit 108, and the buffer circuit 109 that operate similarly to those of the conventional line sequential system source line driver circuit shown in FIG. 5 are described with reference to FIGS. 1 and 2. The shift register 101 outputs sampling pulses sequentially from a first stage to a last stage in accordance with a start pulse (SSP). The first latch circuit 102 samples a video signal (Video) sequentially from a stage to which the sampling pulses are output. The video signal sampled here is held in the first latch circuit 102 until the next sampling pulse output from the shift register 101 is input. In the second latch circuit 103, after video signals are sampled from a first stage to a last stage (here, the N stage) of the first latch circuit 102, that is, all signals of one row are sampled, a latch pulse (LATa) is input and all video signals of one row (LAT 2-1, LAT 2-2, LAT 2-3, LAT 2-4, . . . , LAT 2-N) are output. In FIG. 2, a description is given of a case in which waveforms shown by video signals (LAT 2-1, LAT 2-2, LAT 2-3, LAT 2-4, . . . , LAT 2-N) are output. Note that the respective video signals in FIG. 2 (LAT 2-4 to LAT 2-N) are fixed at either high potential or low potential. The second level shifter circuit 108 converts amplitude of video signals output from the second latch circuit 103 to desired amplitude. The buffer circuit 109 outputs data having a binary value to be input to the source line 114.

Subsequently, a description is given on additional circuits in this embodiment mode, that is, the third latch circuit 104, the exclusive disjunction circuit 105, the first level shifter circuit 107, and the first transmission gate 112, and the second transmission gate 113.

After a latch pulse (LATa) is input to the second latch circuit 103, a latch pulse (LATb) is input to the third latch circuit 104, and video signals (LAT 3-1, LAT 3-2, LAT 3-3, LAT 3-4, . . . , LAT 3-N) are output. A waveform of output data on the third latch circuit 104 is equivalent to the waveform of output data on the second latch circuit 103, which is delayed for the time between the latch pulse (LATa) is input and the latch pulse (LATb) is input. Assuming that the second latch circuit 103 outputs data on the present row (m-th row), the third latch circuit 104 outputs data on the previous row ((m−1)-th row) in the period after the latch pulse (LATa) is input but before the latch pulse (LATb) is input.

In the exclusive disjunction circuit 105, an output signal of the second latch circuit 103 is compared with an output signal of the third latch circuit 104 so that signals (Ex. OR-1, Ex. OR-2, Ex. OR-3, Ex. OR-4, . . . , Ex. OR-N) are output. The signals (Ex. OR-1, Ex. OR-2, Ex. OR-3, Ex. OR-4, . . . , Ex. OR-N) are at high potential in the case where an output signal of the second latch circuit 103 and an output signal of the third latch circuit 104 are different from one another such that one is at high potential and the other is at low potential. On the other hand, the signals are at low potential in the case where the output signals are at the same potential.

A circuit 106 for comparing data on the previous row ((m−1)-th row) with data on the present row (m-th row) is constituted by the third latch circuit 104 and the exclusive disjunction circuit 105. In the period after the latch pulse (LATa) is input but before the latch pulse (LATb) is input, the circuit 106 for comparing data on the previous row ((m−1)-th row) to data on the present row (m-th row) outputs high potential in the case where potential of the data on the present row (m-th row) has changed from potential of the data on the previous row ((m−1)-th row) such that from high potential to low potential, or from low potential to high potential. Conversely, in the period, the circuit 106 outputs low potential in the case where potential of the data on the present row (m-th row) has not changed from that of the data on the previous row ((m−1)-th row). Further, in a period after the latch pulse (LATb) is input but before the following latch pulse (LATa) is input, the exclusive disjunction circuit 105 for comparing the data on the previous row ((m−1)-th row) with the data on the present row (m-th row) constantly outputs low potential.

The first level shifter 107 converts amplitude of the signals (Ex. OR-1, Ex. OR-2, Ex. OR-3, Ex. OR-4, . . . , Ex. OR-N) to desired amplitude.

A description is given on the timing of disconnecting the source line 114 and the buffer circuit 109 by the first transmission gate 112. After writing of the previous row ((m−1)-th row) is completed, all the source lines 114 and the buffer circuit 109 are temporally disconnected. Accordingly, each source line is disconnected from the external positive power source 110 and the negative power source 111. Timing of connecting the source lines 114 to the buffer circuit 109 is described later.

After the disconnecting timing of the source lines 114 and the buffer circuit 109, in the period after the latch pulse (LATa) is input but before the latch pulse (LATb) is input, the second transmission gate 113 connects the source lines 114 (S1, S2, S3, . . . , SN-1, SN) of which the data on the previous row ((m−1)-th row) is different from that on the present row (m-th row) to one another. At this time, in the case where the source line driver circuit has a source line 114 of which the data on the previous row ((m−1)-th row) is at high potential and of which data on the present row (m-th row) is at low potential such as S1 shown in FIG. 2; and a source line 114 of which data on the previous row ((m−1)-th row) is at low potential and of which data on the present row (m-th row) is at high potential, middle potential with a certain level is pre-charged in respective load capacitors 115 without using the positive power source 110 and the negative power source 111 of the buffer circuit which are external power sources. Conversely, in the case where the data on the previous row ((m−1)-th row) is the same as the data on the present row (m-th row), the second transmission gate 113 does not connect the source lines 114 (S1, S2, S3, . . . , SN-1, SN) from one another. Further, in the period after the latch pulse (LATb) is input but before the following latch pulse (LATa) is input, the second transmission gate 113 disconnects the connected source lines 114 (S1, S2, S3, . . . , SN-1, SN) from one another.

After the pre-charging is carried out, the source line 114 is connected to the buffer circuits 109 by the first transmission gate 112. Accordingly, each source line is electrically connected to the external positive power source 110 and negative power source 111. The data on the present row (m-th row) is input to the source lines 114 at the same time as the connecting. Since middle potential with a certain level is pre-charged in advance at this time, electric power for charging is reduced in comparison with that of the conventional configuration.

By repeating the operations in each row, an optional image can be displayed.

Although the conventional display device consumes much electric power for displaying an image such as a natural picture which requires a number of gray scales or a specific pattern of which logic is frequently inverted row by row, such an image and pattern can be displayed with small electric power by a display device and a driving method of the invention, which are constituted as described above, since electric power of the external power source is not consumed for charging and discharging up to middle potential.

Figure 6A:
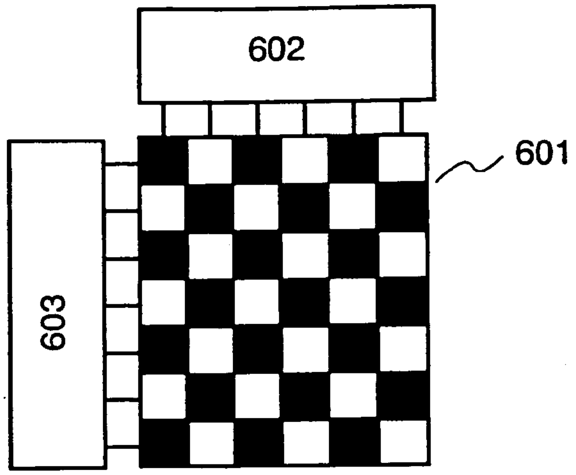
FIGS. 6A to 6C are views showing display patterns.
Figure 6B:
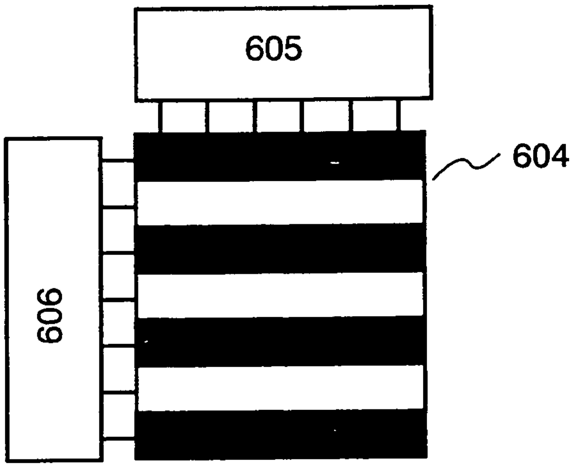
Figure 6C:
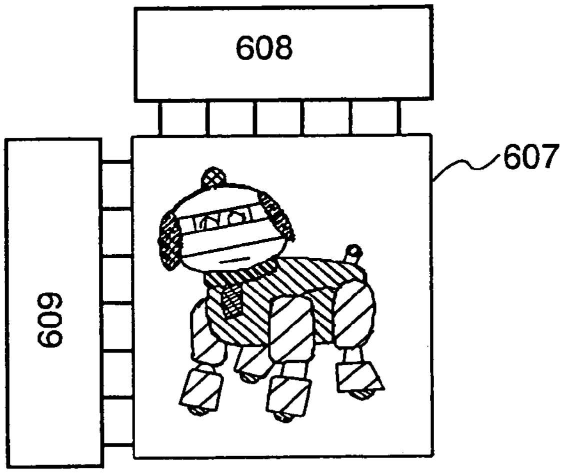

FIG. 6A to 6C show examples of the specific patterns. Reference numerals 601, 604 and 607 denote pixel portions, reference numerals 602, 605 and 608 denote source line driver circuits and reference numerals 603, 606 and 609 denote gate line driver circuits.

FIG. 6A shows a 1 dot grating as an example of the specific pattern of which logic is frequently inverted row by row, in which pixels horizontally adjacent to one another are displayed inversely. Here, the data on the previous row ((m−1)-th row) and the data on the present row (m-th row) of a source line are different from one another; and half of the source lines are at high potential in the previous row ((m−1)-th row) and while the rest of the source lines are at low potential in the previous row((m−1)-th row). Accordingly, by a display device and a driving method of the invention which are constituted as described above, the specific pattern such as the 1 dot grating can be displayed with small electric power since electric power of the external power source is not consumed for charging and discharging up to middle potential row by row.

FIG. 6B shows a horizontal stripe display as an example of the specific pattern of which logic is frequently inverted row by row, in which an image is displayed with only linear lines which are parallel to gate lines. Here, source lines of which the data on the previous row ((m−1)-th row) is different from the data on the present row (m-th row) are at the same potential in the previous row ((m−1)-th row). Therefore, charging and discharging up to middle potential are not carried out by even a display device and a driving method of the invention which are constituted as described above, however, it does not cause a problem since power consumption is the same as that of the conventional device.

In the case where an image shown in FIG. 6C such as a natural picture which requires a number of gray scales is displayed, data on the previous row ((m−1)-th row) and data on the present row (m-th row) of source lines are different from one another in many cases. Further, in the image such as a natural picture which requires a number of gray scales, at least one of the source lines of which the data on the previous row ((m−1)-th row) is different from the data on the present row (m-th row) is at high potential in the previous row ((m−1)-th row), and at least one of the source lines is at low potential in the previous row ((m−1)-th row), in many cases. In the case where at least one of the source lines of which the data on the previous row ((m−1)-th row) is different from the data on the present row (m-th row) is at high potential in the previous row ((m−1)-th row), and at least one of the source lines is at low potential in the previous row ((m−1)-th row), electric power of an external power source is not consumed for charging and discharging up to middle potential by a display device and a driving method of the invention which are constituted as described above. Conversely, in the case where there is no source lines of which the data on the previous row ((m−1)-th row) is different from the data on the present row (m-th row); where all of the potentials of source lines of which potential of the data on the present row (m-th row) changes from potential of the data on the previous row ((m−1)-th row) change such that from high potential to low potential; or all of the potentials of a source lines of which potential of the data on the present row (m-th row)-changes from potential of the data on the previous row ((m−1)-th row) change such that from low potential to high potential, charging and discharging up to middle potential are not carried out. However, power consumption is the same as that of the conventional display device. Therefore, by the display device and the driving method of the invention which are constituted as described above, an image such as a natural picture which requires a number of gray scales can be displayed with low electric power consumption.

Embodiment Mode 2

Figure 3:
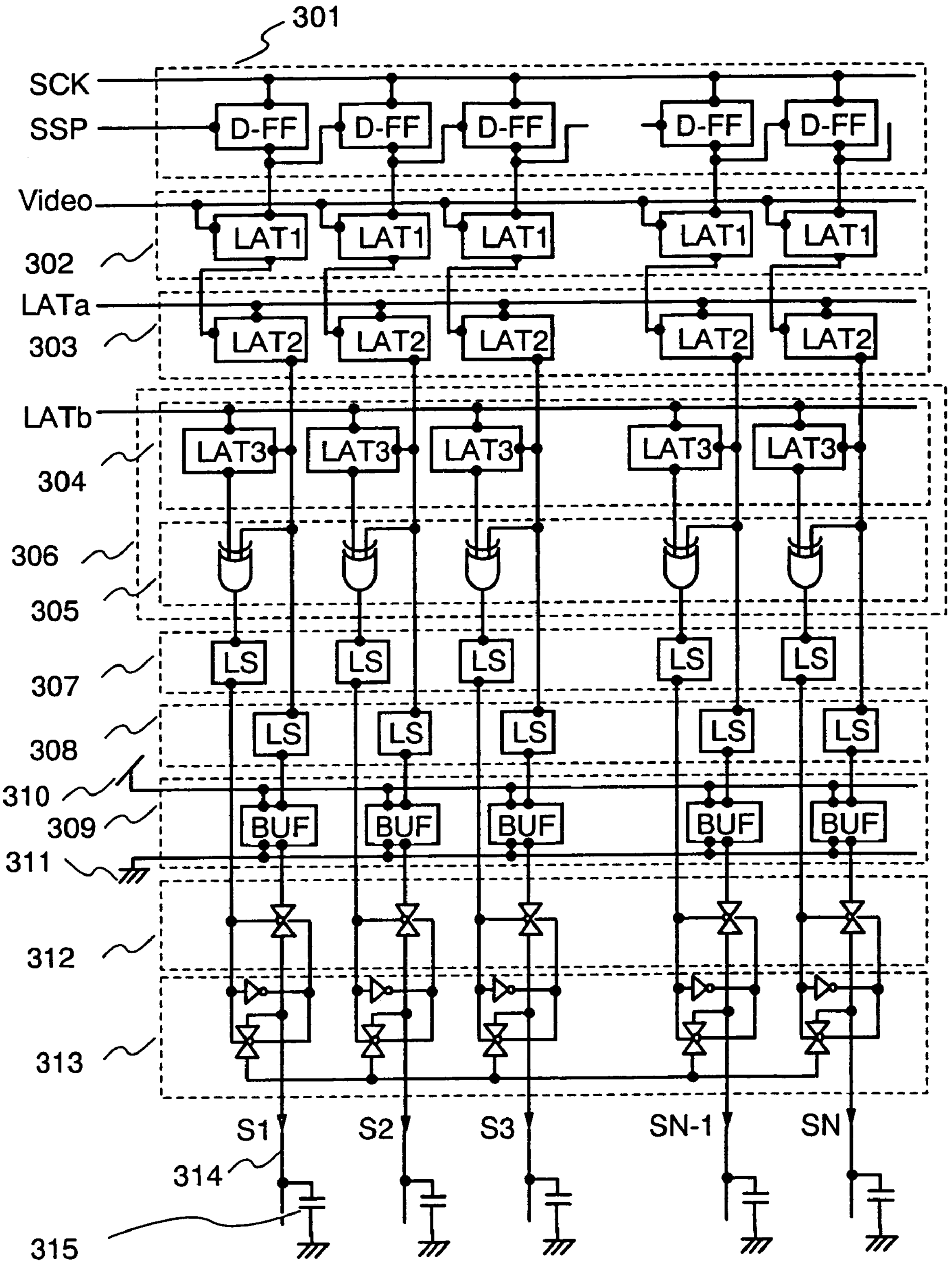
FIG. 3 is a circuit diagram of another embodiment mode of the invention.

FIG. 3 shows a block diagram of a line sequential system source line driver circuit used for a display device of the invention, which has a different constitution from that of Embodiment 1. The line sequential system source line driver circuit has a shift register 301, a first latch circuit 302, a second latch circuit 303, a second level shifter circuit 308, and a buffer circuit 309 similarly to a conventional line sequential system source line driver circuit shown in FIG. 5. Further, although not shown, the line sequential system source line driver circuit has M rows and N columns of pixels, M gate lines, and N source lines in a pixel portion. Furthermore, the line sequential system source line driver circuit has a gate line driver circuit including a shift register, a level shifter, and a buffer similarly to that shown in FIG. 5. In addition, a TFT, a pixel electrode, and a light-emitting element or a liquid crystal element are provided at an intersection of the gate lines and the source lines in the pixel portion.

Output terminals of the second latch circuit 303 are connected to a third latch circuit 304 and an exclusive disjunction circuit 305 in addition to the second level shifter circuit 308. A circuit 306 for comparing data on the previous row ((m−1)-th row) with data on the present row (m-th row) is constituted by the third latch circuit 304 and the exclusive disjunction circuit 305. An output terminal of the third latch circuit 304 is connected to the exclusive disjunction circuit 305. An output terminal of the exclusive disjunction circuit 305 is connected to a first level shifter circuit 307. Output terminals of the first level shifter circuit 307 are connected to p-channel TFT side gate terminals of a first transmission gate 312 and n-channel TFT side gate terminals of a second transmission gate 313. An output terminal of the buffer circuit 309 is electrically connected to each source line 314 through the first transmission gate 312. Respective source lines 314 (S1, S2, S3, . . . , Sn-1, Sn) are be able to be connected to one another through the second transmission gate 313.

A description is given on operations of the source line driver circuit. The shift register 301, the first latch circuit 302, the second latch circuit 303, the third latch circuit 304, the first level shifter circuit 307, the second level shifter circuit 308, the buffer circuit 309, the exclusive disjunction circuit 305, and the second transmission gate 313 operate similarly to those of Embodiment Mode 1.

Note that, although an exclusive disjunction circuit and a transmission gate are used here, the invention is not limited to them. Any circuit having a comparing function and a circuit having a switching function can also be used.

Figure 4:
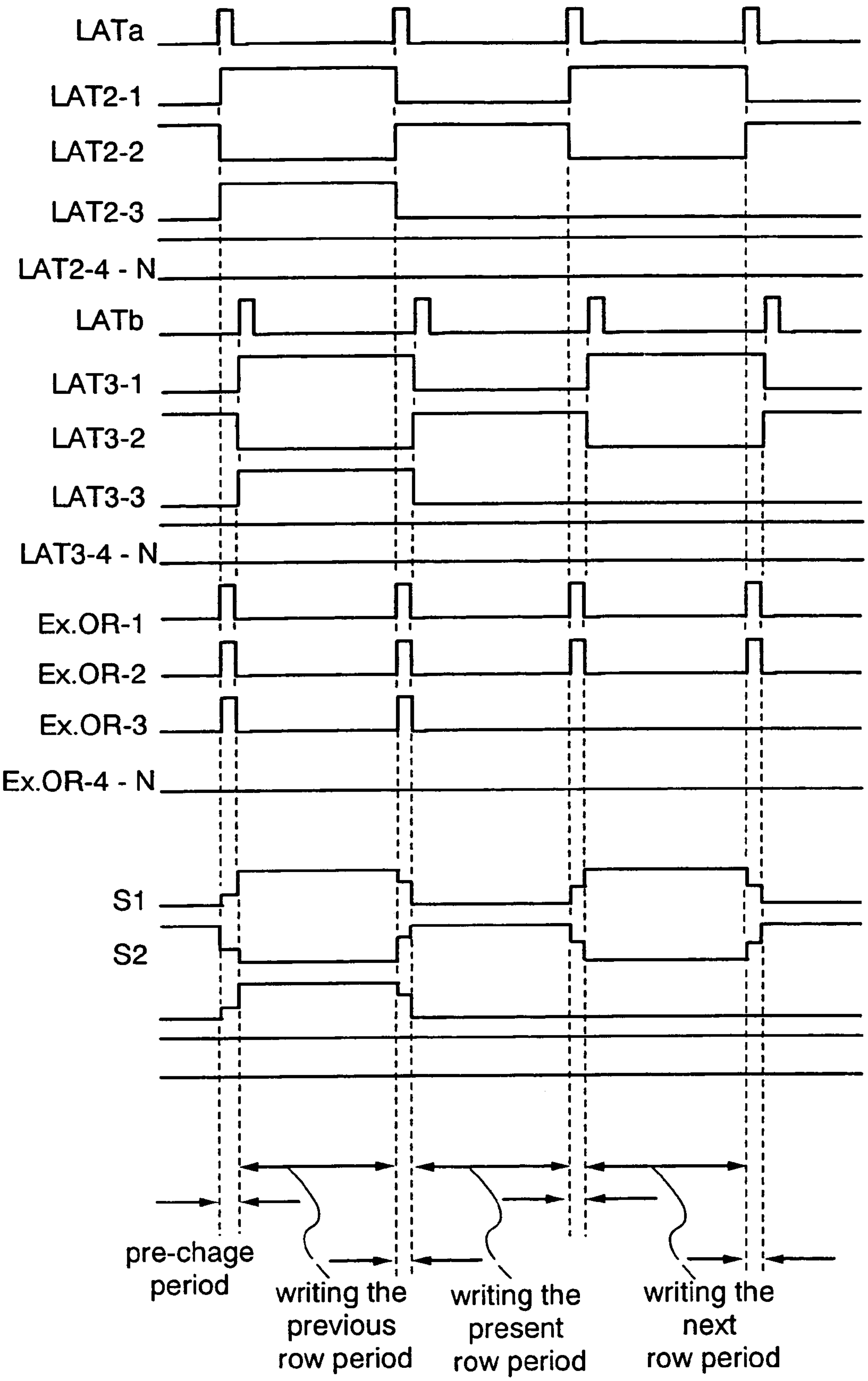
FIG. 4 is a timing chart of the another embodiment mode of the invention.

In the period after the latch pulse (LATa) is input but before the latch pulse (LATb) is input, the first transmission gate disconnects only the source line 314 of which the data on the previous row ((m−1)-th row) is different from that on the present row (m-th row), and the buffer circuits 309. Accordingly, the source line 314 and a power source circuit are disconnected. Simultaneously, in the period after the latch pulse (LATa) is input but before the following latch pulse (LATb) is input, the second transmission gate 313 connects each source line 314 (S1, S2, S3, . . . , SN-1, SN) of which the data on the previous row ((m−1)-th row) is different from that on the present row (m-th row) to one another. At this time, in the case where the source line driver circuit has a source line 314 of which the data on the previous row ((m−1)-th row) is at high potential and the data on the present row (m-th row) is at low potential such as S1 shown in FIG. 4; and a source line 314 of which data on the previous row ((m−1)-th row) is at low potential and the data on the present row (m-th row) is at high potential such as S2, middle potential with a certain level is pre-charged in each load capacitor 315 without using a positive power source 310 and a negative power source 311 of the buffer circuit which are external power sources. Conversely, in the case where the data on the previous row ((m−1)-th row) is the same as the data on the present row (m-th row), the first transmission gate 312 does not disconnect each source line 314 to the buffer circuit 309; and the second transmission gate 313 does not connect the source lines 314 (S1, S2, S3, . . . , SN-1, SN). Further, in the period after the latch pulse (LATb) is input but before the following latch pulse (LATa) is input, the first transmission gate 312 holds connecting each source line 314 to the buffer circuit 309. Simultaneously, in the period after the latch pulse (LATb) is input but before the following latch pulse (LATa) is input, the second transmission gate 313 does not connect the source lines 314 (S1, S2, S3, . . . , SN-1, SN).

After the pre-charging is carried out, data on the present row (m-th row) is input to the source line 314. Since middle potential with a certain level is pre-charged in advance at this time, electric power consumed by an external power source for charging is reduced in comparison with that of the conventional configuration.

By repeating the operations in each row, an optional image can be displayed.

In this embodiment mode, the line sequential system source line driver circuit has a configuration in which the first transmission gates 312 is controlled in accordance with an output of the circuit 306 for comparing the data on the previous row ((m−1)-th row) with the data on the present row (m-th row). Therefore, it is not necessary that a signal for controlling the first transmission gates 312 be input externally, which contributes to reduction of the number of input pins of a panel. With respect to display devices used for a portable information terminal and the like, reduction of the input pins is greatly effective in downsizing a panel.

Although the conventional display device consumes much electric power for displaying an image such as a natural picture which requires a number of gray scales and a specific pattern of which logic is frequently inverted row by row, such an image and pattern can be displayed with small electric power by a display device and a driving method of the invention, which are constituted as described above, since the external power source does not consume electric power for charging and discharging up to middle potential.

Embodiment Mode 3

This embodiment mode shows an example of manufacturing a dual emission display device in which the invention can apply.

Figure 7A:
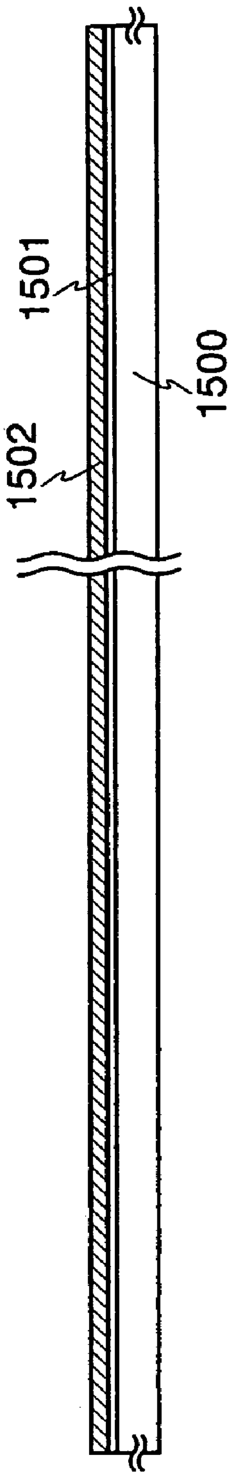
FIG. 7A to 7C are views showing manufacturing steps of an EL display device.

A base film 1501 is formed over a substrate 1500 as shown in FIG. 7(A). For example, a glass substrate such as barium borosilicate glass or alumino-borosilicate glass, a quarz substrate, a stainless substrate or the like is used as the substrate 1500. Further, a substrate formed of plastic typified by PET, PES and PEN, or flexible synthetic resin such as acrylic can be used.

The base film 1501 is provided to prevent alkaline metal such as Na and alkaline-earth metal which are contained in the substrate 1500 from diffusing into a semiconductor film, and would adversely affect characteristics of a semiconductor element. Therefore, the base film 1501 is formed by using an insulating film such as silicon nitride or silicon oxide containing nitrogen which can prevent alkaline metal and alkaline-earth metal from diffusing into the semiconductor film. In this embodiment mode, a silicon oxide film containing nitrogen is formed to be 10 to 400 nm thick (preferably, 50 to 300 nm) by plasma CVD.

Note that the base film 1501 may have either a single layer structure of an insulating film such as silicon nitride, silicon oxide containing nitrogen, or silicon nitride containing oxide, or a stacked structure in which a plurality of insulating films such as silicon oxide, silicon nitride, silicon oxide containing nitrogen, or silicon nitride containing oxide are stacked.

Sequentially, a semiconductor film 1502 is formed over the base film 1501. The thickness of the semiconductor film 1502 is 25 to 100 nm (preferably, 30 to 60 nm). Note that the semiconductor film 1502 may be either an amorphous semiconductor or a polycrystalline semiconductor. Further, silicon germanium (SiGe) as well as silicon (Si) can be used for the semiconductor. In the case where silicon germanium is used, the concentration of germanium is preferably approximately 0.01 to 4.5 atomic %.

Figure 7B:
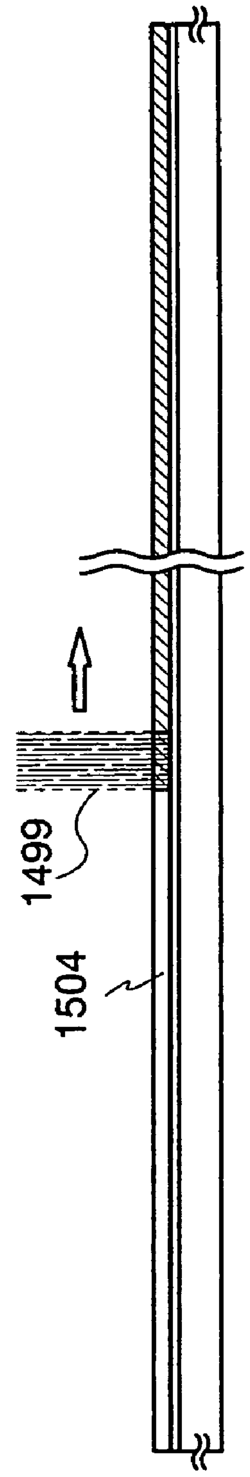

Then the semiconductor film 1502 is irradiated with linear laser 1499 to be crystallized as shown in FIG. 7(B). Before the laser crystallization is carried out, heat treatment may be applied for one hour at 500° C. in order to improve resistance of the semiconductor film 1502 against the laser.

The crystallization may be carried out by laser irradiation, by heating with an element which promotes crystallization of a semiconductor film, or by combination of crystallization by heating with an element which promotes crystallization of a semiconductor film and laser irradiation. Here, the crystallization is carried out by laser irradiation.

A continuous wave laser, or pulse laser whose repetition rate is higher than 10 MHz, preferably, higher than 80 MHz as a pseudo CW laser can be used for laser crystallization.

As examples of the continuous wave laser, there are an Ar laser, Kr laser, $CO_2$ laser, YAG laser, $YVO_4$ laser, YLF laser, $YAlO_3$ laser, $GdVO_4$ laser, $Y_2O_3$ laser, ruby laser, Alexandrite laser, titanium-sapphire laser, helium-cadmium laser, and the like.

Further, as the pseudo CW laser, a pulse laser such as Ar laser, Kr laser, excimer laser, $CO_2$ laser, YAG laser, $YVO_4$ laser, YLF laser, $YAlO_3$ laser, $GdVO_4$ laser, $Y_2O_3$ laser, or ruby laser can be used in the case where a pulse higher than 10 MHz, preferably higher than 80 MHz can be oscillated.

Such a pulse laser shows a similar effect to a continuous wave laser if the repetition rate is increased.

For example, in the case where a solid state laser capable of continuous oscillation is used, crystals with a large grain size can be obtained by irradiation with a laser beam of a second to fourth harmonic. Typically, it is desirable that the second harmonic (532 nm) or the third harmonic (355 nm) of a YAG laser (fundamental wave: 1064 nm) be used. The energy density may be approximately 0.01 to 100 MW/cm$^2$ (preferably, 0.1 to 10 MW/cm$^2$).

By irradiating the semiconductor film 1502 with a laser beam, a crystalline semiconductor film 1504 whose crystallinity is improved is formed.

Figure 7C:
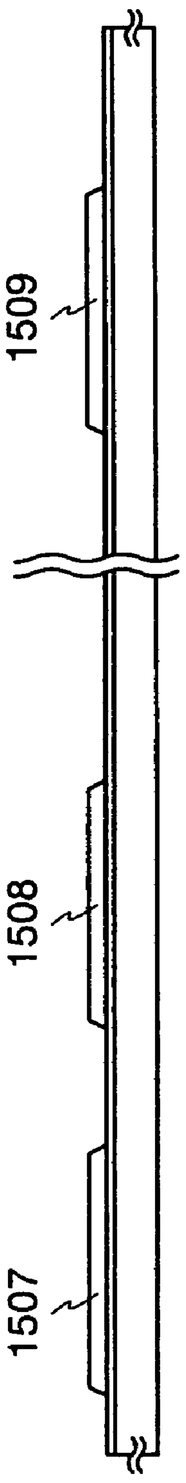

Island-like semiconductor films 1507 to 1509 are formed by patterning the crystalline semiconductor film 1504 as shown in FIG. 7C.

Impurities are introduced into the island-like semiconductor films 1507 to 1509 in order to control a threshold voltage of thin film transistors. In this embodiment mode, boron (B) is introduced into the island-like semiconductor films by adding diborane ($B_2H_6$).

Figures 8A, 8B, 8C:
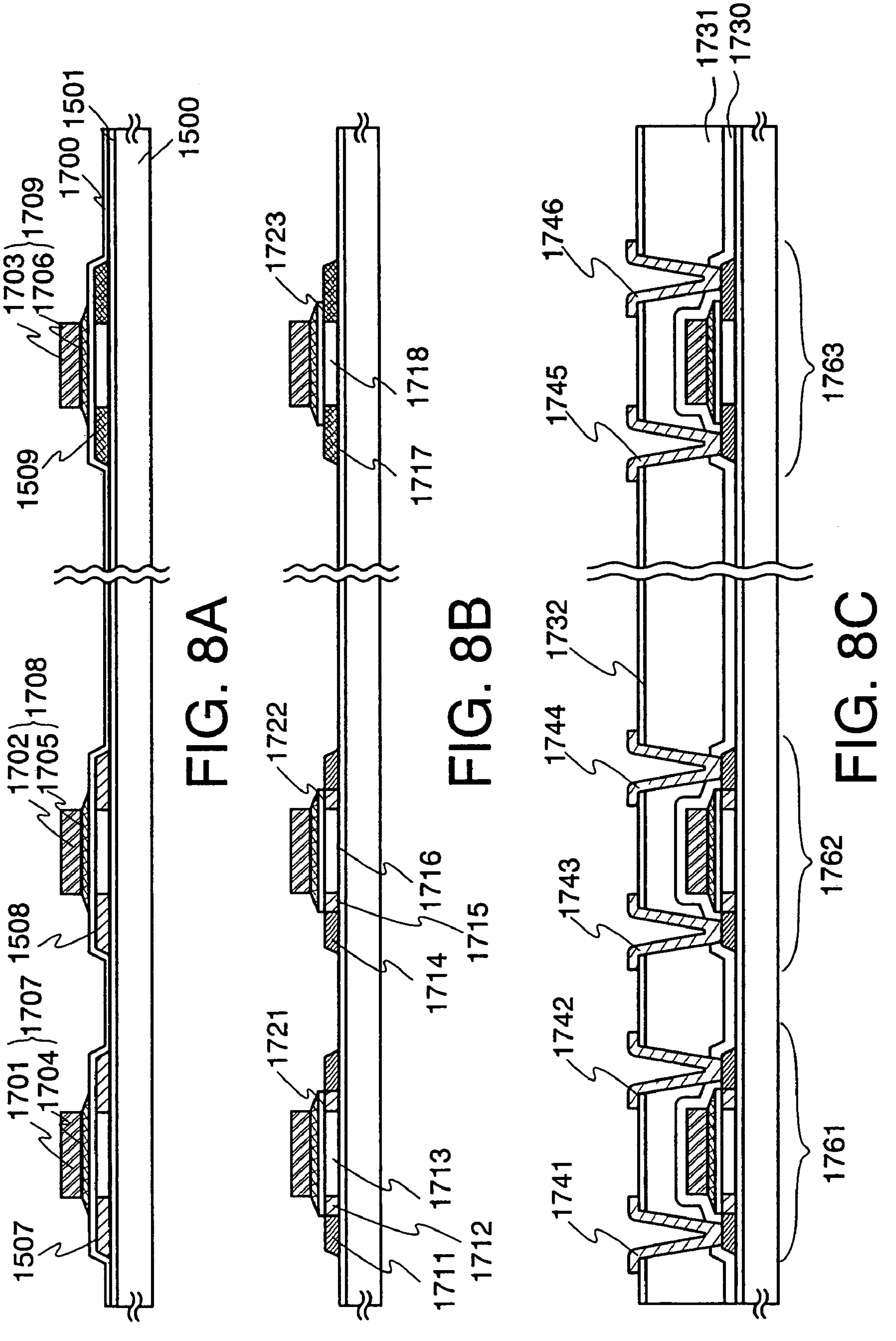
FIGS. 8A to 8C are views showing manufacturing steps of the EL display device.

An insulating film 1700 is deposited so as to cover the island-like semiconductor films 1507 to 1509 (FIG. 8A). For example, silicon oxide (SiO), silicon nitride (SiN), silicon oxide containing nitrogen (SiON), or the like can be used for the insulating film 1700. As the deposition method, plasma CVD, sputtering, or the like can be used.

After a conductive film is deposited over the insulating film 1700, gate electrodes 1707 to 1709 are formed by patterning the conductive film.

The gate electrodes 1707 to 1709 are formed using a conductive film in a single layer or stacked layers of two or more layers. In the case where two or more conductive films are stacked, the gate electrodes 1707 to 1709 may be formed by stacking films each comprises at least one selected from tantalum (Ta), tungsten (W), titanium (Ti), molybdenum (Mo), and aluminum (Al), or an alloy material or a compound material which is mainly composed of the element. Further, the gate electrodes may be formed using a semiconductor film typified by a polycrystalline silicon film doped with impurity elements such as phosphorous (P).

In this embodiment mode, the gate electrodes 1707 to 1709 are formed using a stacked film of tantalum nitride (TaN) with a thickness of 30 nm and tungsten (W) with a thickness of 370 nm. In this embodiment, upper layer gate electrodes 1701 to 1703 are formed using tungsten (W), and lower layer gate electrodes 1704 to 1706 are formed using tantalum nitride (TaN).

The gate electrodes 1707 to 1709 may be formed as a part of agate wiring. Alternatively, after forming another gate wiring, the gate electrodes 1707 to 1709 may be connected thereto.

A source region, a drain region, a low concentration impurity region and the like are formed by doping the island-like semiconductor films 1507 to 1509 with impurities which provide n or p type conductivity using the gate electrodes 1707 to 1709 or a resist which is deposited and patterned as masks, and.

First, phosphorous (P) is introduced into the island-like semiconductor films 1507 to 1509 by using phosphine ($PH_3$) under the condition that the acceleration voltage is 60 to 120 kV, and the dosage is $1\times10^{13}$ to $1\times10^{15}$ atoms cm$^{-2}$.

In order to form a p-channel TFT 1763, boron is introduced into the island-like semiconductor films by using diborane ($B_2H_6$) under the condition that the applied voltage is 60 to 100 kV, for example, 80 kV, and the dosage is $1\times10^{13}$ to $5\times10^{15}$ atoms cm$^{-2}$, for example, $3\times10^{15}$ atoms cm$^{-2}$. Accordingly, a source region, a drain region 1717 and a channel forming region 1718 of a p-channel TFT 1763 are formed (FIG. 8B).

Sequentially, gate insulating films 1721 to 1723 are formed by etching the insulating film 1700, thereby a part of the semiconductor films is exposed.

Phosphorous (P) is introduced into the island-like semiconductor films 1507 and 1508 which become the n-channel TFTs 1761 and 1762 respectively by using phosphine ($PH_3$) under the condition that the applied voltage is 40 to 80 kV, for example, 50 kV, and the dosage is $1.0\times10^{15}$ to $2.5\times10^{16}$ atoms cm$^{-2}$, for example, $3.0\times10^{15}$ atoms cm$^{-2}$. Accordingly, channel forming regions 1713 and 1716, low concentration impurity regions 1712 and 1715and source or drain regions 1711 and 1714 of the n-channel TFTs 1761 and 1762 are formed (FIG. 8B).

In this embodiment, phosphorous (P) is contained at a concentration of $1\times10^{19}$ to $5\times10^{21}$ atoms cm$^{-3}$ in the source or drain region 1711 of the n-channel TFT 1761 and the source or drain region 1714 of the n-channel TFT 1762 respectively. Further, phosphorous (P) is contained at a concentration of $1\times10^{18}$ to $5\times10^{19}$ atoms cm$^{-3}$ in the low concentration impurity region 1712 of the n-channel TFT 1761 and the low concentration impurity region 1715 of the n-channel TFT 1762 respectively. Furthermore, boron (B) is contained at a concentration of $1\times10^{19}$ to $5\times10^{21}$ atoms $cm^{-3}$ in the source or drain region 1717 of the p-channel TFT 1763.

In this embodiment mode, the p-channel TFT 1763 is used as a pixel TFT of a dual emission display device. The n-channel TFTs 1761 and 1762 are used as TFTs of a driver circuit which drives the pixel TFT 1763. It is to be noted that the pixel TFT 1763 is not required to be a p-channel TFT, and may be an n-channel TFT. Further, it is not necessary that the driver circuit be formed by combining a plurality of n-channel TFTs, and may be a circuit formed by combining an n-channel TFT and a p-channel TFT complementally, or a circuit formed by combining a plurality of p-channel TFTs.

Next, an insulating film 1730 containing hydrogen is deposited. A silicon oxide film containing nitrogen (SiON film) obtained by PCVD is used for the insulating film 1730 containing hydrogen. Alternatively, a silicon nitride film containing oxygen (SiNO film) may be used. Note that the insulating film 1730 containing hydrogen is a first interlayer insulating film, and also a light transmissive insulating film containing silicon oxide.

After that, impurity elements added to the island-like semiconductor films are activated. The impurity elements may be activated by irradiation with a laser beam, RTA, or heating in a nitride atmosphere at 550° C. for 4 hours. In the case where the semiconductor films are crystallized by using a metal element which promotes the crystallization as typified by nickel, gettering can also be carried out for reduction of nickel in the channel forming regions at the same time as the activation of the impurity elements.

Then the island-like semiconductor films are hydrogenated by entirely heating at 410° C. for an hour. It is to be noted that this process might be unnecessary in the case where the heat treatment is carried out in a nitride atmosphere at 550□ for 4 hours as described above.

A planarization film is formed as a second interlayer insulating film 1731. As the planarization film, a light-transmissive inorganic material (silicon oxide, silicon nitride, silicon nitride containing oxygen and the like), a photosensitive or nonphotosensitive organic material (polyimide, acrylic, polyamide, polyimide amide, resist, or benzocyclobutene), a stack of them, or the like is used. Further, as another light-transmissive film used for the planarization film, an insulating film formed of a silicon oxide film containing an alkyl group obtained by a coating method can be used. For example, an insulating film can be used, which is formed using silica glass, an alkyl siloxane polymer, an alkylsilsesquioxane polymer, a hydrogenated silsesquioxane polymer or the like. As examples of a siloxane polymer, there are PSB-K1 and PSB-K31 which are coating insulating film materials produced by Toray industries Inc and ZRS-5PH which is a coating insulating film material produced by Catalysts & Chemicals Industries Co., Ltd (CCIC).

Then a third interlayer insulating film 1732 having light transmissivity is formed. The third interlayer insulating film 1732 is provided as an etching stopper film for protecting the planarization film which is the second interlayer insulating film 1731 when patterning a light-transmissive electrode 1750 in a subsequent step. It is to be noted that, in the case where the second interlayer insulating film 1731 becomes an etching stopper film when patterning the light-transmissive electrode 1750, the third interlayer insulating film 1732 is not required.

Then, contact holes are formed in the first interlayer insulating film 1730, the second interlayer insulating film 1731, and the third interlayer insulating film 1732 by using a new mask. After the mask is removed and a conductive film (stacked film of TiN, Al and TiN) is formed, it is etched by etching (by dry etching with a mixed gas of $BCl_3$ and $Cl_2$) using another mask so as to form electrodes or wirings 1741 to 1745 (a source wire and a drain wire of a TFT, current supply wire, and the like) (FIG. 8C). It is to be noted that the electrodes and wirings may be electrically connected to one another by forming them separately although the electrodes and the wirings are formed integrally. Note that TiN is one of materials which has high adhesion to a high heat-resistant planarization film. In addition, it is preferable that an N content of TiN be less than 44 atoms % to provide a good ohmic contact with a source region or a drain region of the TFT.

Figure 9A:
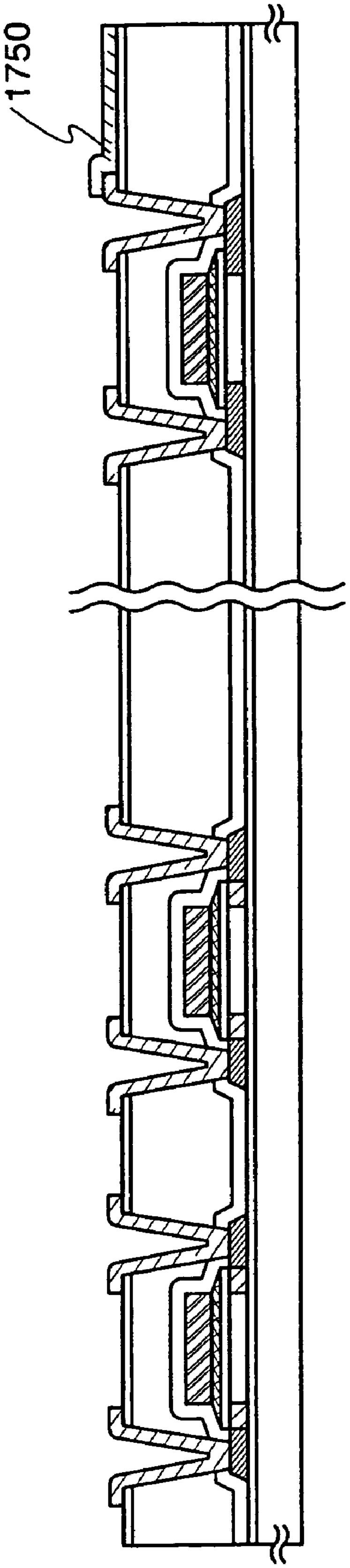
FIGS. 9A and 9B are views showing manufacturing steps of the EL display device.

A light-transmissive electrode 1750, that is an anode of an organic light-emitting element is formed with a thickness of 10 to 800 nm by using anew mask. As the light-transmissive electrode 1750, a high work function (work function of more than 4.0 eV) light-transmissive conductive material can be used such as indium tin oxide (ITO), IZO (Indium Zinc Oxide) obtained by mixing 2 to 20% of zinc oxide (ZnO) with ITO or indium oxide which contains Si elements (FIG. 9A).

An insulator 1733 (referred to as bank, partition wall, barrier wall, or the like) covering an end of the light-transmissive electrode 1750 is formed by using a new mask. As the insulator 1733, a photosensitive or nonphotosensitive organic material obtained by a coating method (polyimide, acrylic, polyamide, polyimide amide, resist, or benzocyclobutene), or a SOG film (for example, a SiOx film containing an alkyl group) is used in thickness of 0.8 to 1 μm.

The first to fifth layers which form a light-emitting element 1751, 1752, 1753, 1754, and 1755 are formed by a deposition method or a coating method. Note that degasification is preferably performed by vacuum heating in order to improve reliability of the light-emitting element before the layer 1751 containing an organic compound is formed. For example, heat treatment is preferably carried out at 200 to 300° C. in a low pressure atmosphere or an inert atmosphere in order to remove gas contained in the substrate before the deposition of the organic compound material. Note that heat treatment at higher temperature (410° C., for example) can be applied in the case where the interlayer insulating films and the partition wall are formed of $SiO_x$ films having high heat resistance.

Molybdenum oxide ($MoO_x$), 4,4'-bis[N-(1naphthyl)-N-phenyl-amino]-biphenyl (a-NPD) and rubrene are selectively co-deposited over the light-transmissive electrode 1750 using a vapor-deposition mask so as to form the first layer 1751 containing an organic compound (first layer).

Note that a material having a high hole injection property such as copper phthalocyanine (CUPC), vanadium oxide ($VO_x$), ruthenium oxide ($RuO_x$), or tungsten oxide ($WO_x$) can be used besides $MoO_x$. Alternatively a high molecular weight material having a high hole injection property such as poly (ethylene dioxythiophene)/poly(styrene sulfonate) solution (PEDOT/PSS) formed by a coating method may be used as the first layer 1751 containing an organic compound.

A hole transporting layer (second layer) 1752 is formed over the first layer 1751 containing the organic compound by selectively depositing a-NPD by using a vapor-deposition mask. Note that a material having a high hole transporting property as typified by an aromatic amine-based compound such as 4,4'-bis[N-(3-methylphenyl)-N-phenyl-amino]-biphenyl (abbreviated as TPD), 4,4',4"-tris[N,N-diphenyl-amino]-triphenylamine (abbreviated as TDATA), 4,4',4"-tris [N-(3-methylphenyl)-N-phenyl-amino]-triphenylamine (abbreviated as MTDATA) or the like can be used besides a-NPD.

A light-emitting layer 1753 (third layer) is selectively formed. The vapor-deposition masks are aligned for respective light-emission colors (R, G, and B) to selectively deposit the light-emitting layer 1753 so that the device can perform full color display.

As a light-emitting layer 1753 which emits red light, a material such as $Alq_3$: DCM or $Alq_3$: rubrene: BisDCJTM is used. As a light-emitting layer 1753 which emits green light, a material such as $Alq_3$: DMQD (N,N'-dimethyl quinacridone) or $Alq_3$: coumarin 6 is used. As a light-emitting layer 1753 which emits blue light, a material such as a-NPD or tBu-DNA is used.

Subsequently, an electron transporting layer (fourth layer) 1754 is formed over the light-emitting layer 1753 by selectively depositing $Alq_3$ (tris(8-quinolinolato)aluminum) by using a vapor-deposition mask. Note that a material having a high electron transporting property as typified by a metal complex having quinoline skeleton or benzoquinoline skeleton, such as tris(5-methyl-8-quinolinolato) aluminum (abbreviated as $Almq_3$), bis(10-hydroxybenzo[h]-quinolinato) beryllium(abbreviated as $BeBq_2$), or bis(2-methyl-8-quinolinolato)-4-phenylphenolato-aluminum (abbreviated as BAlq) can be used besides $Alq_3$. Other than these, a metal complex having oxazole-based or thiazole-based ligands such as bis[2-(2-hydroxyphenyl)-benzoxazolato]zinc (abbreviated as Zn $(BOX)_2$), or bis[2-(2-hydroxyphenyl)-benzothiazolato]zinc (abbreviated as $Zn(BTZ)_2$) can be used. In addition to the metal complex, 2-(4-biphenylyl)-5-(4-tert-buthylphenyl)-1,3,4-oxadiazole (abbreviated as PBD), 1,3-bis[5-(p-tert-butylphenyl)-1,3,4-oxadiazole-2-yl]benzene (abbreviated as OXD-7), 3-(4-tert-butylphenyl)-4-phenyl-5-(4-biphenylyl)-1,2,4-triazole (abbreviated as TAZ), 3-(4-tert-butylphenyl)-4-(4-ethylphenyl)-5-(4-biphenylyl)-1,2,4-triazole (abbreviated as p-EtTAZ), bathophenanthroline (abbreviated as BPhen), bathocuproine (abbreviated as BCP), or the like can be used as the electron transporting layer 1754 since they have a high electron transporting property.

An electron injection layer (fifth layer) 1755 is formed so as to cover the electron transporting layer and the insulator by co-depositing 4,4'-bis(5-methylbenzoxazole-2-yl) stilbene (abbreviated as BzOs), and lithium (Li). Using the benzoxazole derivative (BzOS) prevents the electron injection layer 1755 from being damaged by sputtering when forming a light-transmissive electrode 1756 in a subsequent step. Note that a material having a high electron injection property such as alkaline metal or alkaline earth metal can be used as typified by $CaF_2$, lithium fluoride (LiF), cesium fluoride (CsF), or the like, besides BzOs:Li. Alternatively, a mixture of $Alq_3$ and magnesium (Mg) can be used.

A light-transmissive electrode 1756, that is a cathode of an organic light-emitting element is formed with a thickness of 10 to 800 nm over the electron injection layer 1755. For example, the light-transmissive electrode 1756 can be formed using indium tin oxide (ITO) as well as IZO (Indium Zinc Oxide) which is obtained by mixing ITO containing Si elements or Indium Oxide with 2 to 20% of zinc oxide (ZnO).

Through abovementioned steps, a light-emitting element is formed. Respective materials and respective film thickness of an anode, the layers containing an organic compound (the first layer to the fifth layer) and a cathode which constitute the light-emitting element are selected or adjusted appropriately. It is desirable that the anode and the cathode be formed to have nearly equal film thickness, preferably about 100 nm by using the same material.

Figure 9B:
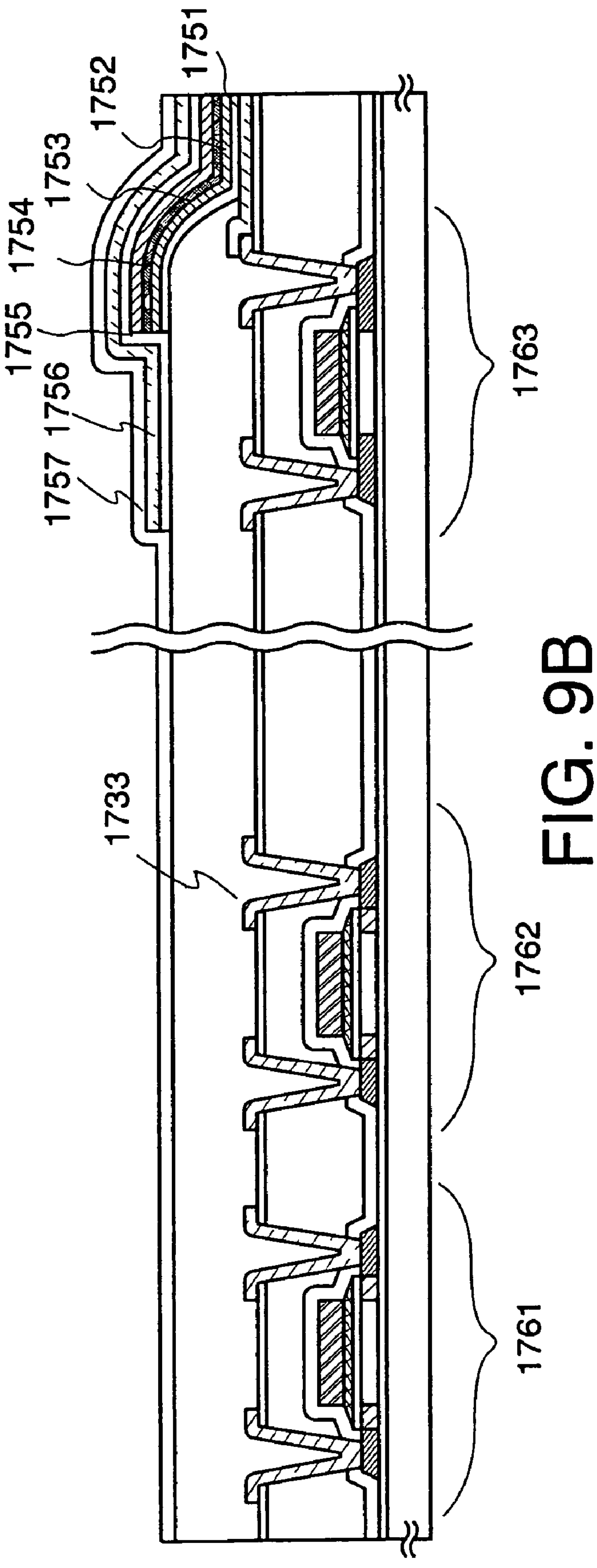

A light-transmissive protective layer 1757 for preventing moisture intrusion is formed by covering the light-emitting element, if there is necessity. As the light-transmissive protective film 1757, a silicon nitride film, a silicon oxide film, a silicon nitride film containing oxygen (SiNO film (composition ratio: N>O)) or a silicon oxide film containing nitrogen (SiON film (composition ratio: N<O)), a thin film mainly composed of carbon (such as a DLC film and CN film), or the like which is obtained by sputtering or CVD can be used (FIG. 9B).

A second substrate 1770 and the substrate 1500 are attached to each other by using a sealing material containing a gap material for keeping space between the substrates. A glass substrate or a quartz substrate, which has light transmissivity may be used for the second substrate 1770. The space between the pair of substrates may be filled with air (inert gas) and drying agent may be disposed therein. Alternatively, the space between a pair of substrates may be filled with a light-transmissive sealing material (such as ultraviolet-curable, heat-curable epoxy resin) (FIG. 10).

The light-emitting element can emit light in two directions, that is, to both sides, since each of the light-transmissive electrodes 1750 and 1756 is formed of a light-transmissive material.

The panel constitution as described above enables light from the top side to be emitted in almost the same quantity as the light is emitted from the bottom side.

Figure 10:
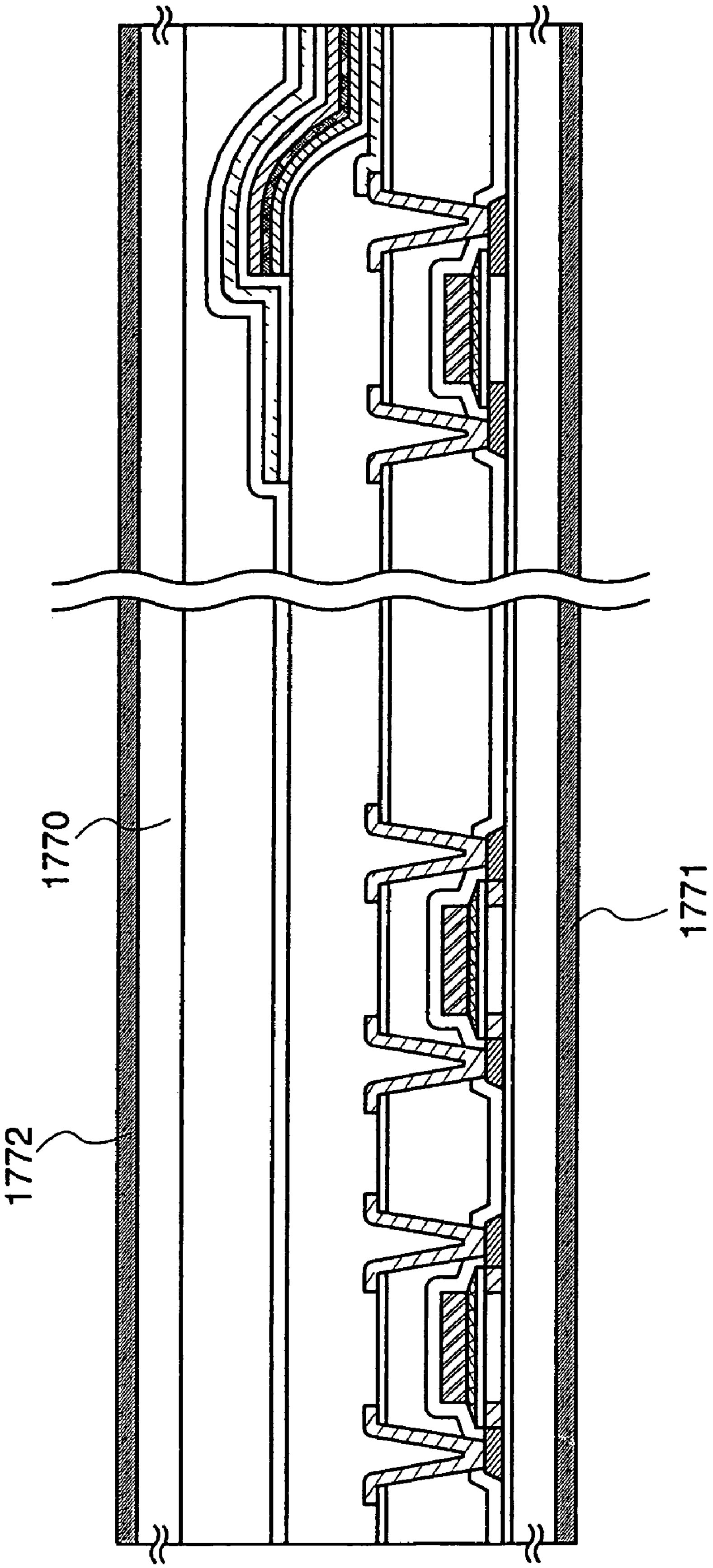
FIG. 10 is a view showing manufacturing steps of the EL display device.

Finally, optical films (polarizing plate or circularly polarizing plate) 1771 and 1772 are provided so as to improve contrast (FIG. 10).

Figure 11:
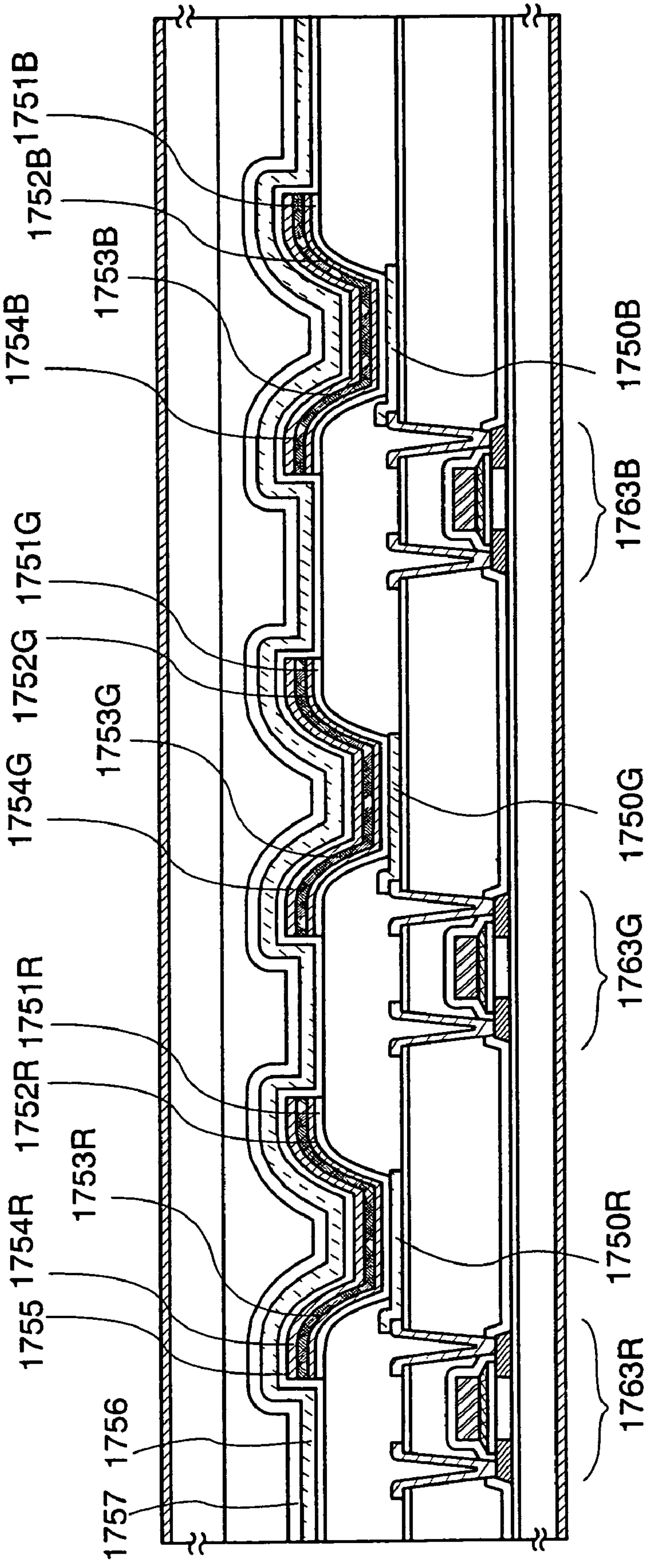
FIG. 11 is a view showing manufacturing steps of the EL display device.

FIG. 11 shows a cross-sectional view of light emitting elements for respective light-emission colors (R, G, and B). The red (R) light-emitting element includes a pixel TFT 1763R, a light-transmissive electrode (anode) 1750R, a first layer 1751R, a second layer (hole transporting layer) 1752R, a third layer (light-emitting layer) 1753R, a forth layer (electron transporting layer) 1754R, a fifth layer (electron injection layer) 1755, a light-transmissive electrode (cathode) 1756, and a light-transmissive protective layer 1757.

The green (G) light-emitting element includes a pixel TFT 1763G, a light-transmissive electrode (anode) 1750G, a first layer 1751G a second layer (hole transporting layer) 1752G, a third layer (light-emitting layer) 1753G, a forth layer (electron transporting layer) 1754G, a fifth layer (electron injection layer) 1755, a light-transmissive electrode (cathode) 1756, and a light-transmissive protective layer 1757.

The blue (B) light-emitting element includes a pixel TFT 1763B, a light-transmissive electrode (anode) 1750B, a first layer 1751B, a second layer (hole transporting layer) 1752B, a third layer (light-emitting layer) 1753B, a forth layer (electron transporting layer) 1754B, a fifth layer (electron injection layer) 1755, a light-transmissive electrode (cathode) 1756, and a light-transmissive protective layer 1757.

In this embodiment mode, TFTs are top-gate TFTs. However, the invention is not limited to this structure and a bottom-gate (inversely staggered) TFT or a staggered TFT can also be used. Further, the invention is not limited to a single-gate TFT so that a multi-gate TFT having a plurality of channel forming regions such as a double-gate TFT may be used.

Embodiment Mode 4

As examples of an electronic appliance to which the invention is applied, there are a video camera, a digital camera, a goggle type display, a navigation system, an audio-reproducing device (car audio component stereo or the like), a computer, a game machine, a portable information terminal (mobile computer, mobile phone, mobile game machine, a electronic book, or the like), an image-reproducing device having a recording medium (specifically, a device for reproducing a recording medium such as a digital versatile disk (DVD) and having a display for displaying the reproduced image. The examples of the electronic appliance are shown below.

Figure 12:
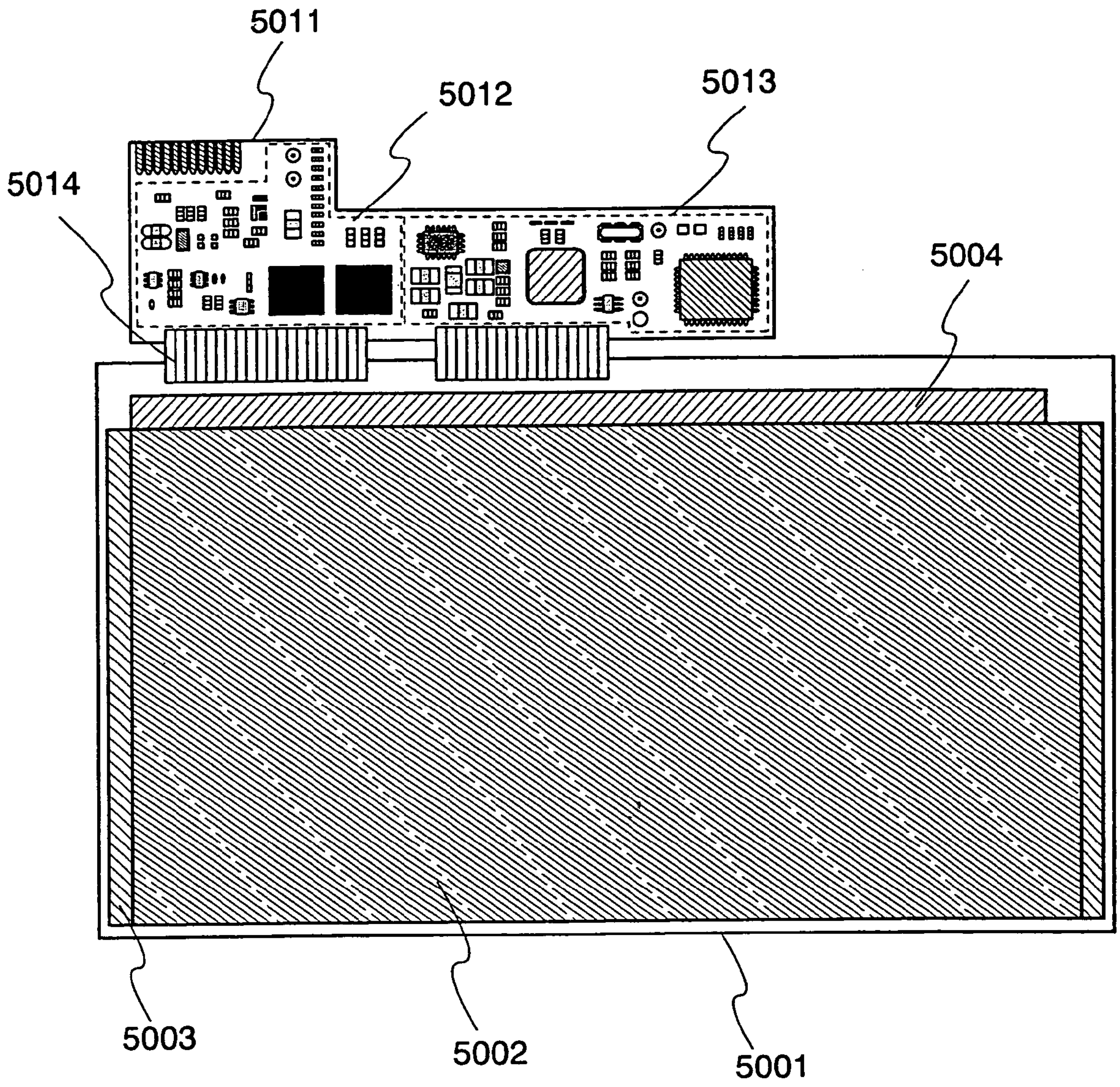
FIG. 12 is a view showing an example of an electronic appliance using the invention.

FIG. 12 shows a liquid crystal display module or an EL display module, in which a display panel 5001 and a circuit substrate 5011 are combined. On the circuit substrate 5011, a control circuit 5012, a signal dividing circuit 5013 and the like are formed and electrically connected to the display panel 5001 by a connecting wiring 5014.

The display panel 5001 has a pixel portion 5002 in which a plurality of pixels are provided, a scan line driver circuit 5003, a signal line driver circuit 5004 for supplying a selected pixel with video signals. Note that, in the case where an EL display module E is formed, the display panel 5001 may be formed using the aforementioned embodiment mode. A liquid crystal display module can also be used as well as an EL display module. The driver circuit of the abovementioned embodiment mode can be used for the driver circuit portion for controlling such as the scan driver circuit 5003 and the signal line driver circuit 5004. A liquid crystal television set or an EL television set can be completed by using a liquid crystal display module or an EL display module which is shown in FIG. 12.

Figure 13:
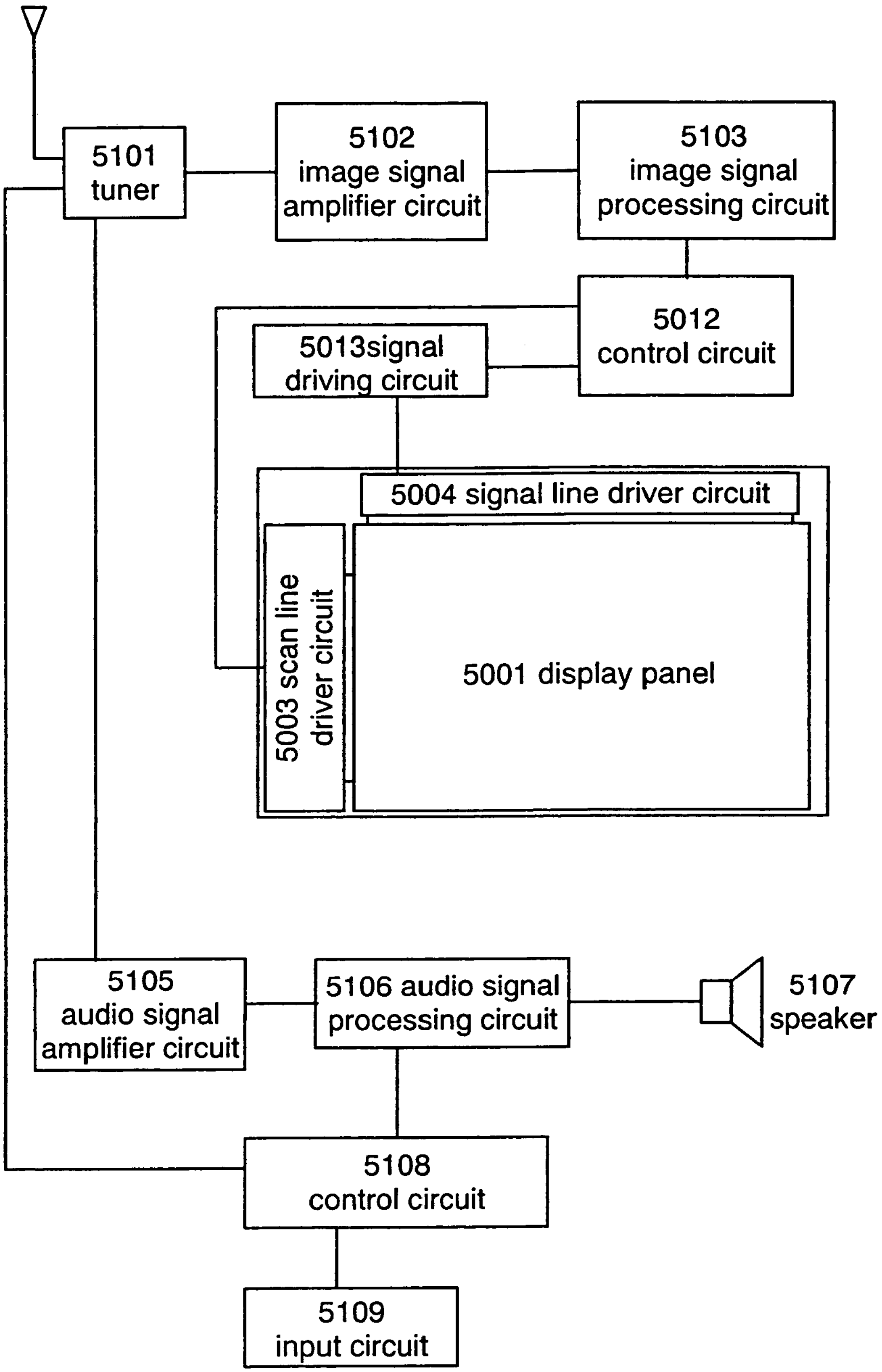
FIG. 13 is a diagram showing an example of an electronic appliance using the invention.

FIG. 13 is a block diagram which shows a main constitution of a liquid crystal television set or an EL television set. A tuner 5101 receives image signals and audio signals. The image signals are processed by an image signal amplifier circuit 5102, an image signal processing circuit 5103 which converts signals output from the image signal amplifier circuit 5102 to respective color signals of red, green, and blue, and a control circuit 5012 for converting the image signals to meet the input specification of a driver IC. The control circuit 5012 outputs signals to a scan line side and a signal line side. In the case of a digital drive, the signal line side may be provided with a signal dividing circuit 5013 so that an input digital signal is divided into m signals to be supplied.

Among signals received in the tuner 5101, audio signals are sent to an audio signal amplifier circuit 5105, and the output is supplied to a speaker 5107 through an audio signal processing circuit 5106. The control circuit 5108 receives control data such as a receiving station (reception frequency) and a volume from an input portion 5109, and sends out signals to the tuner 5101 and the audio signal processing circuit 5106.

Figure 14A:
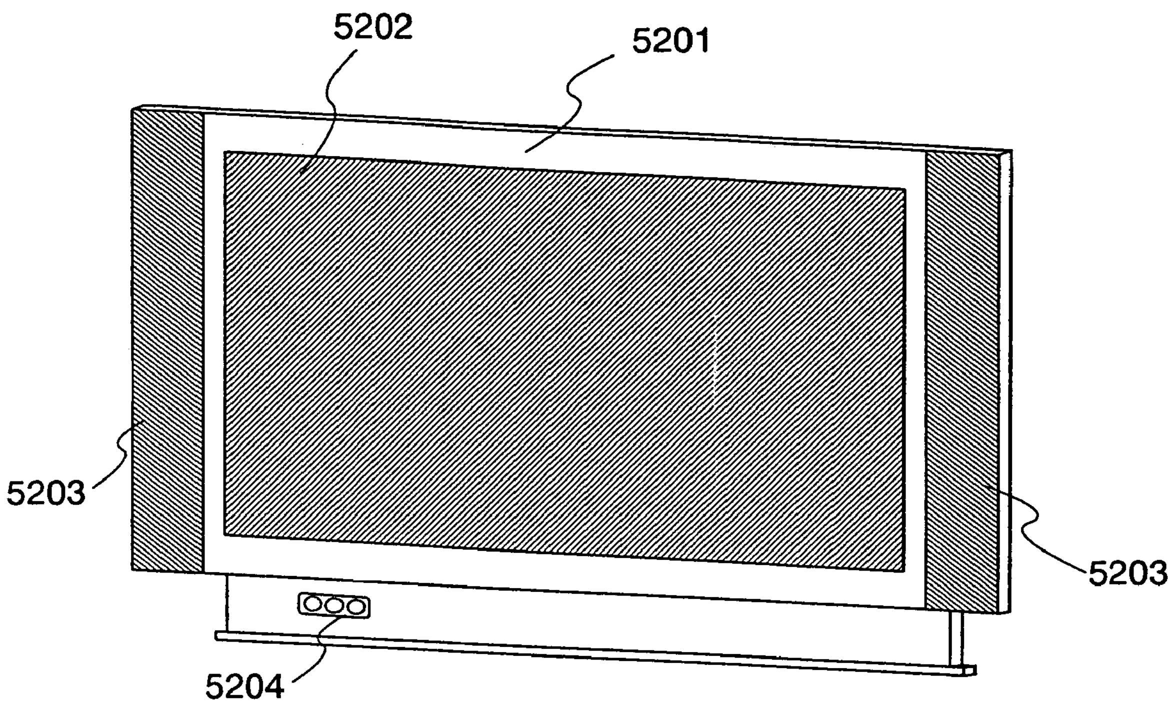
FIGS. 14A and 14B are views showing examples of electronic appliances using the invention.

A liquid crystal display module or an EL display module is incorporated in a housing 5201 so as to complete a television set as shown in FIG. 14A. A display panel 5202 is formed by a liquid crystal display module or an EL display module. A speaker 5203, a control switch 5204 and the like are appropriately provided.

Figure 14B:
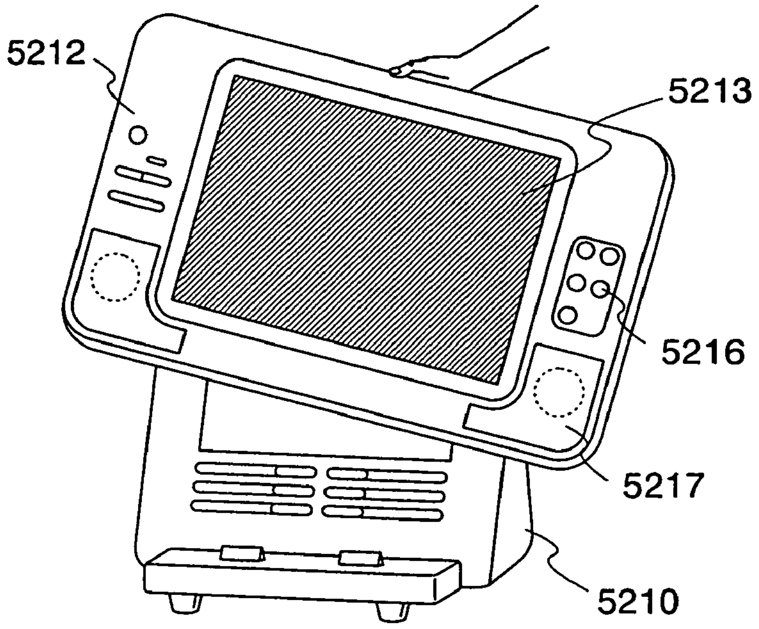

FIG. 14B shows a wireless television set which have a portable display. A battery and a signal receiver are incorporated in a housing 5212, and the battery drives a display portion 5213 and a speaker portion 5217. The battery can be charged repeatedly by using a battery charger 5210. Further, the battery charger 5210 can send and receive image signals, which can be sent to the signal receiver of the display. The housing 5212 is controlled by a control key 5216. The device shown in FIG. 14B can be called as an image and audio interactive communication device since signals can be sent from the housing 5212 to the battery charger 5210 by controlling the control key 5216. The device can also be called a general-purpose remote-control device since signals are sent from the housing 5212 to the battery charger 5210 by controlling the control key 5216 and signals which can be sent by the battery charger 5210 are received by another electronic appliance so that telecommunication of the electronic appliance can be controlled. The invention can be applied to the display portion 5213, a control circuit portion, and the like.

By using the invention for the television sets shown in FIGS. 12 to 14B, a low-power-consumption television set can be manufactured.

It is needless to say that the invention can be applied to not only a television set but to various purposes such as particularly large area display media typified by a monitor of a personal computer, information display panels at train stations, airports and the like, and advertising display panels on the streets.

Figure 15A:
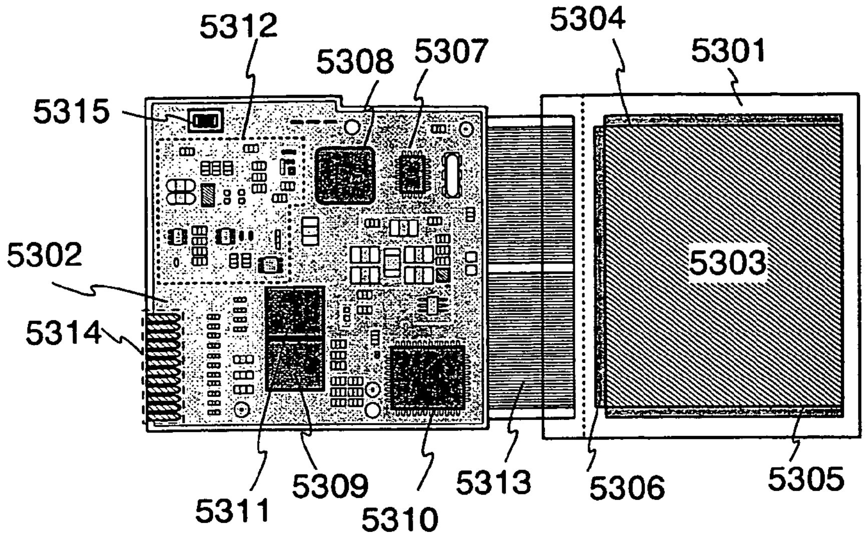
FIGS. 15A and 15B are views each showing an example of an electronic appliance using the invention.

FIG. 15A shows a module formed by combining a display panel 5301 and a printed wiring substrate 5302. The display panel 5301 has a pixel portion 5303 in which a plurality of pixels are provided, a first scan line driver circuit 5304, a second scan line driver circuit 5305, and a signal line driver circuit 5306 for supplying video signals to selected pixels. The abovementioned embodiment mode can be used for the signal line driver circuit 5306.

The printed wiring substrate 5302 has a controller 5307, a central processing unit (CPU) 5308, a memory 5309, a power source circuit 5310, an audio processing circuit 5311, a transmission and reception circuit 5312 and the like. The printed wiring substrate 5302 is connected with the display panel 5301 by a flexible print circuit (FPC) 5313. A capacitor and a buffer circuit may be provided over the printed wiring substrate 5302 in order to prevent noise interruption in a power source voltage or a signal, and also to prevent slow rising of signals. Further, the controller 5307, the audio processing circuit 5311, the memory 5309, the CPU 5308, the power source circuit 5310, and the like can be mounted over the display panel 5301 by using a COG (Chip On Glass) method. By the COG method, the printed wiring substrate 5302 can be downsized.

Various control signals are input and output through an interface (I/F) 5314 provided over the print wiring substrate 5302. An antenna port 5315 for transmission and reception signals to/from an antenna is provided over the print wiring substrate 5302.

Figure 15B:
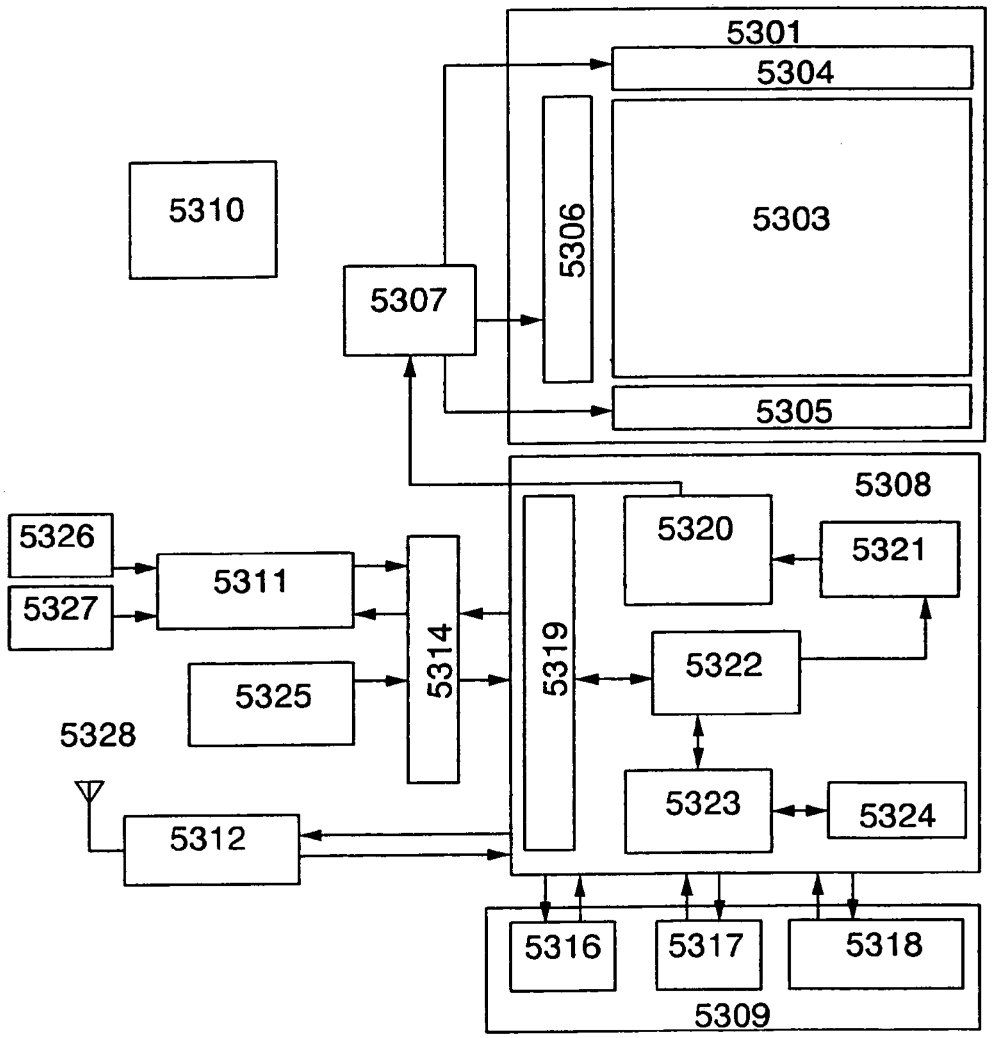

FIG. 15B shows a block diagram of the module shown in FIG. 15A. The module has a VRAM 5316, a DRAM 5317, a flash memory 5318, and the like as the memory 5309. The VRAM 5316 stores image data to be displayed on the display panel 5301, the DRAM 5317 stores image data or audio data, and the flash memory 5318 stores various programs.

Although connecting wirings to the power source circuit 5310 are not shown, the power source circuit 5310 is connected so as to supplied electric power for operating the display panel 5301, the controller 5307, the CPU 5308, the audio processing circuit 5311, the memory 5309, and the transmission and reception circuit 5312. A current source may be provided in the power source circuit 5310 in accordance with a specification of the display panel 5301.

The CPU 5308 has a control signal generating circuit 5320, a decipherer 5321, a register 5322, an arithmetic circuit 5323, a RAM 5324, and an interface 5319 for the CPU 5308. Various signals input into the CPU 5308 through the interface 5319 are once stored in the register 5322, and then input to the arithmetic circuit 5323, the decipherer 5321 and the like. The arithmetic circuit 5323 carries out an operation in accordance with input signals, and specifies an address to which various instructions are sent. On the other hand, the signals input to the decipherer 5321 are decoded and input to the control signal generating circuit 5320. The control signal generating circuit 5320 generates signals including the various directions in accordance with the input signals, and sends them to the address specified in the arithmetic circuit 5323, specifically to the memory 5309, the transmission and reception circuit 5312, the audio processing circuit 5311, and the controller 5307.

The memory 5309, the transmission and reception circuit 5312, the audio processing circuit 5311, and the controller 5307 are respectively operated in accordance with a received instruction. A description is given below on the operations thereof.

Signals input from an input means 5325 such as a pointing device or a keyboard are sent to the CPU 5308 mounted over the printed wiring substrate 5302 through the interface (I/F) 5314. The control signal generating circuit 5320 converts image data stored in the VRAM 5316 to a prescribed format so as to be sent to the controller 5307 in accordance with the signals sent from the input means 5325 such as a pointing device or a keyboard.

The controller 5307 processes signals including the image data sent from the CPU 5308 in accordance with the specification of the display panel 5301 so as to be sent to the display panel 5301. Further, the controller 5307 generates a Hsync signal (Horizontal Synchronizing signal), a Vsync signal (Vertical Synchronizing signal), a clock signal CLK, an alternating current voltage (AC Cont), and a switching signal L/R in accordance with the power source voltage input from the the power source circuit 5310 or the various signals input from the CPU 5308, which is supplied to the display panel 5301.

The transmission and reception circuit 5312 which processes signals transmitted or received as an electric wave at an antenna 5328 includes high frequency circuits such as an isolator, a band pass filter, a VCO (Voltage Controlled Oscillator), an LPF (Low Pass Filter), a coupler, and a balun. The signals including audio data among the signals transmitted or received in the transmission and reception circuit 5312 are sent to the audio processing circuit 5311 in accordance with the instructions from the CPU 5308.

The signals including audio data sent in accordance with the instructions of the CPU 5308 are demodulated into audio signals in the audio processing circuit 5311, and sent to a speaker 5327. Audio signals sent from a microphone 5326 are modulated in the audio processing circuit 5311, and sent to the transmission and reception circuit 5312 in accordance with the instructions from the CPU 5308.

The controller 5307, the CPU 5308, the power source circuit 5310, the audio processing circuit 5311, and the memory 5309 can be mounted as a package of this embodiment mode. This embodiment mode can be applied to any circuits except the high frequency circuits such as an isolator, a band pass filter, a VCO (Voltage Controlled Oscillator), an LPF (Low Pass Filter), a coupler, or a balun.

Figure 16:
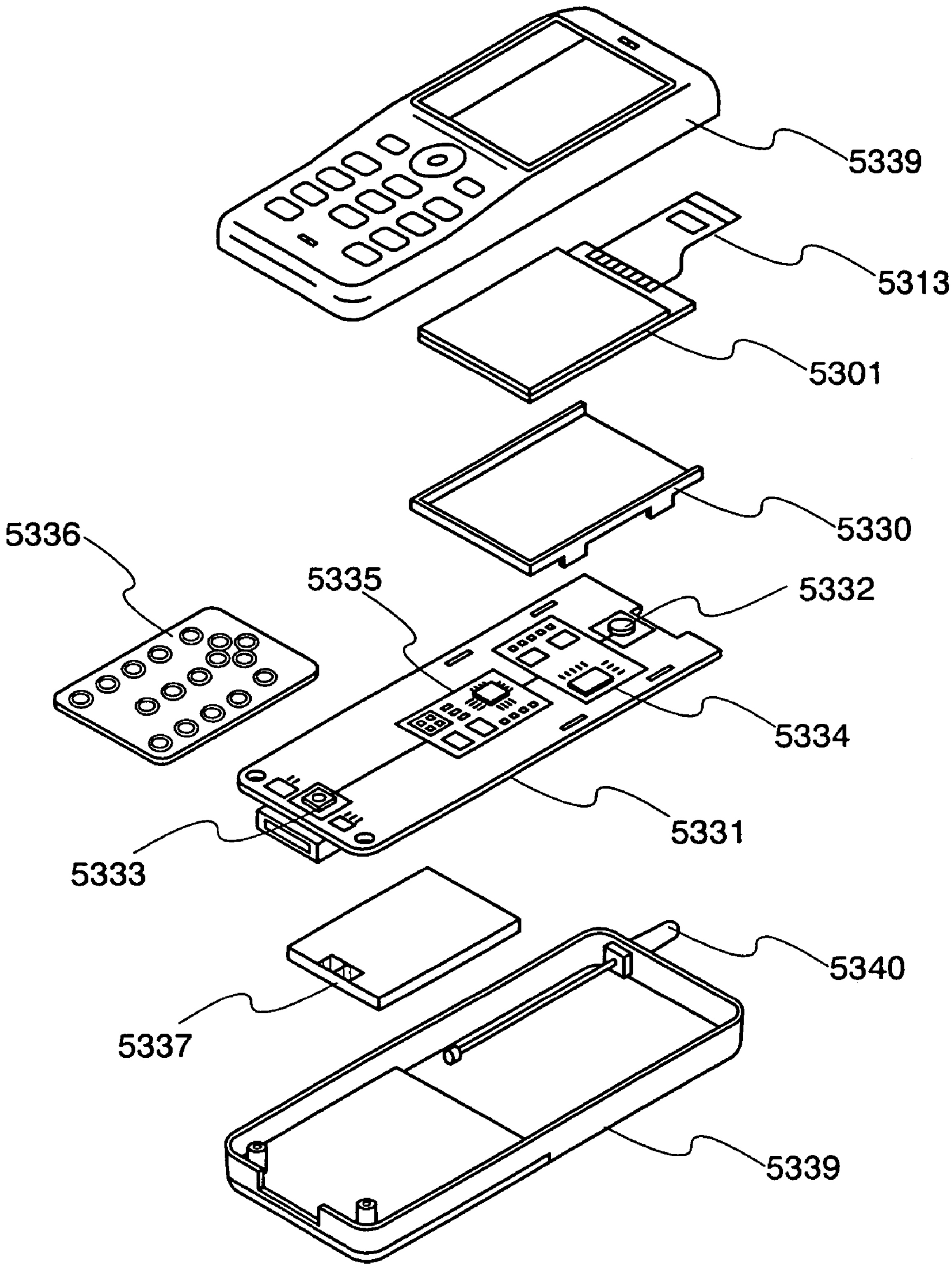
FIG. 16 is a view showing an example of an electronic appliance using the invention.

FIG. 16 shows one mode of a mobile phons including a module shown in FIGS. 15A and 15B. The display panel 5301 is incorporated in a housing 5330, which can be freely detached. The shape and the dimension of the housing 5330 can be changed in accordance with the size of the display panel 5301. The housing 5330 for fixing the display panel 5301 is fitted into the printed substrate 5331 so as to assemble a module.

The display panel 5301 is connected to the printed substrate 5331 through the FPC 5313. A signal processing circuit 5335 including a speaker 5332, a microphone 5333, a transmission and reception circuit 5334, a CPU, a controller and the like is formed over the printed substrate 5331. Such a module, an input means 5336, a battery 5337, and an antenna 5340 are combined to be incorporated in housings 5339. A pixel portion of the display panel 5301 is disposed to be seen from an opening window of the housings 5339.

Mobile phones of this embodiment mode can be changed to be various modes in accordance with the functions or the purposes. For example, if a plurality of display panels are provided or housings are provide in a plurality of separate pieces so as to be opened or closed with a hinge, the above-mentioned effects can be obtained.

A low-power-consumption mobile phone and so on can be manufactured by applying the invention to the module or the mobile phone shown in FIGS. 15 and 16.

Figure 17A:
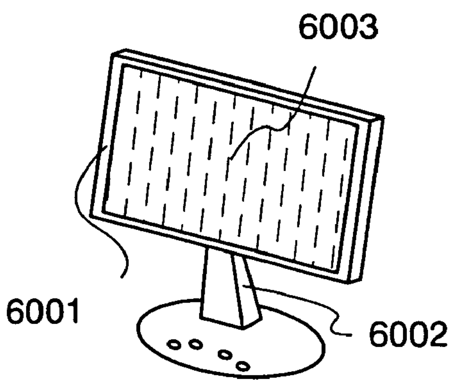
FIGS. 17A to 17E are views showing examples of electronic appliances using the invention.

FIG. 17A is a liquid crystal display or an OLED display, which is constituted by a housing 6001, a supporting base 6002, a display portion 6003, and the like. The constitutions of the liquid crystal display module or the EL display module shown in FIG. 12 and the display panel shown in FIG. 15A can be applied to the display portion 6003.

By using the invention, a low-power-consumption display can be manufactured.

Figure 17B:
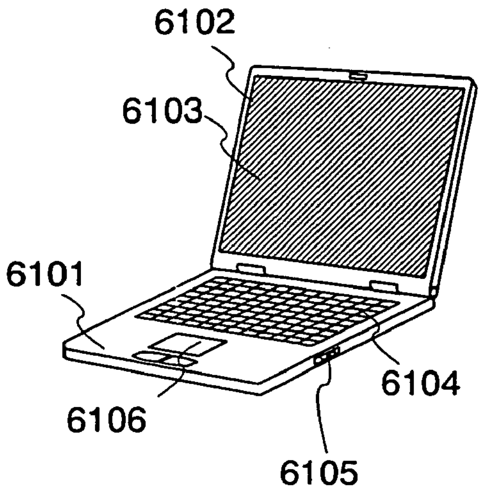

FIG. 17B is a computer, which includes a body 6101, a housing 6102, a display portion 6103, a keyboard 6104, an external connection port 6105, a pointing mouse 6106, and the like. The constitutions of the liquid crystal display module liquid crystal display module or the EL display moduleEL display module shown in FIG. 12 and the display panel shown in FIG. 15A are applied to the display portion 6103.

By using the invention, a low-power-consumption computer can be manufactured.

Figure 17C:
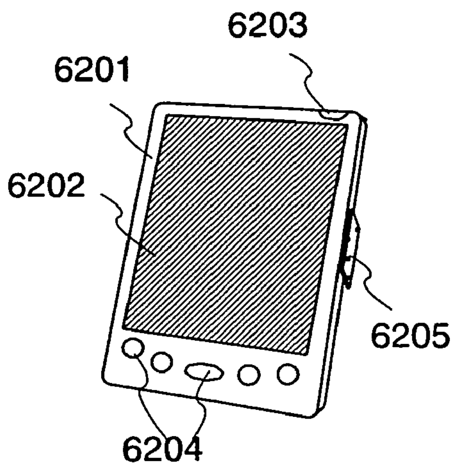

FIG. 17C is a portable computer, which includes a body 6201, a display portion 6202, a switch 6203, control keys 6204, an infrared port 6205, and the like. The constitutions of the liquid crystal display module liquid crystal display module or the EL display moduleEL display module shown in FIG. 12 and the display panel shown in FIG. 15A can be applied to the display portion 6202.

By using the invention, a low-power-consumption computer can be manufactured.

Figure 17D:
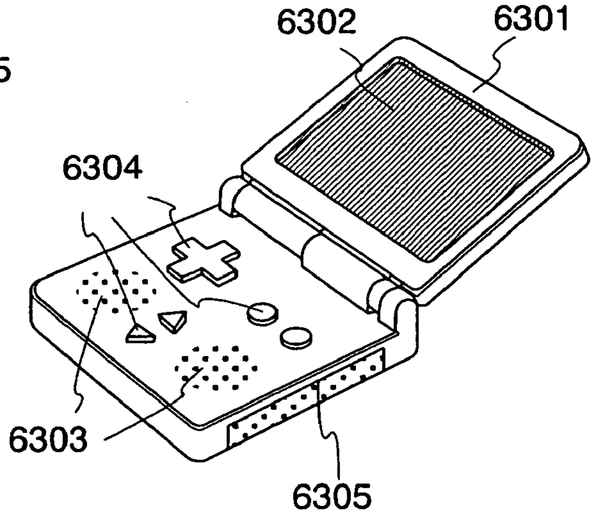

FIG. 17D is a portable game machine, which includes a housing 6301, a display portion 6302, speaker portions 6303, control keys 6304, a recording medium insert portion 6305, and the like. The constitutions of the liquid crystal display module liquid crystal display module or the EL display moduleEL display module shown in FIG. 12 and the display panel shown in FIG. 15A can be applied to the display portion 6302.

By using the invention, a low-power-consumption game machine can be manufactured.

Figure 17E:
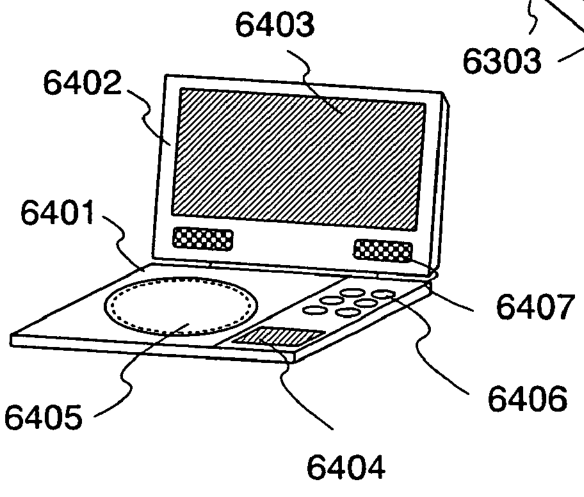

FIG. 17E is a portable image reproducing device provided with recording medium (specifically, a DVD reproducing device), which includes a body 6401, a housing 6402, a display portion A 6403, a display portion B 6404, a recording medium (DVD or the like) reading portion 6405, a control key 6406, a speaker portion 6407, and the like. The display portion A 6403 mainly displays image data, and the display portion B 6404 mainly displays text data. The constitutions of the liquid crystal display module liquid crystal display module or the EL display moduleEL display module shown in FIG. 12 and the display panel shown in FIG. 15A can be applied to the display portion A 6403, the display portion B 6404, a control circuit portion, and the like. Note that an image reproducing device provided with a recording medium includes a home-use game machine and the like.

By using the invention, a low-power-consumption image reproducing device can be manufactured.

A heat-resistant plastic substrate can be used as well as a glass substrate for display devices used for the electronic appliances in accordance with the size, the intensity, or the purpose. Accordingly, the display devices can be further reduced in size and weight.

Note that this embodiment mode is only illustrative, and therefore the invention is not limited to such applications.

This embodiment mode can be freely implied in combination with any of the abovementioned embodiment modes.

This application is based on Japanese Patent Application Ser. No. 2004-339612 filed in Japan Patent Office on Nov. 24, 2004, the entire contents of which are hereby incorporated by reference.

What is claimed is:

1. A display device comprising:

M rows and N columns (M and N are natural numbers respectively) of pixels;

M gate lines;

N source lines;

a circuit for storing a data signal of an (m−1)-th row (2≦m≦M, m is a natural number);

N circuits, wherein an n-th circuit (1≦n≦N, n is a natural number) of the N circuits is configured to compare a data signal of an m-th row with the data signal of the (m−1)-th row before the data signal of the m-th row is input to an n-th source line of the N source lines;

N first switches electrically connected to each other and electrically connected to a power source circuit, wherein an n-th first switch of the N first switches is electrically connected to the n-th source line; and N second switches electrically connected to each other, wherein an n-th second switch of the N second switches is electrically connected to the n-th source line.

2. A display device comprising:

M rows and N columns (M and N are natural numbers respectively) of pixels;

M gate lines;

N source lines;

a circuit for storing a data signal of an (m−1)-th row (2≦m≦M, m is a natural number);

N exclusive disjunction circuits, wherein an n-th exclusive disjunction circuit (1≦n≦N, n is a natural number) of the N exclusive disjunction circuits is configured to compare a data signal of an m-th row with the data signal of the (m−1)-th row before the data signal of the m-th row is input to an n-th source line of the N source lines;

N first switches electrically connected to each other and electrically connected to a power source circuit, wherein an n-th first switch of the N first switches is electrically connected to the n-th source line; and N second switches electrically connected to each other, wherein an n-th second switch of the N second switches is electrically connected to the n-th source line.

3. A display device comprising:

M rows and N columns (M and N are natural numbers respectively) of pixels;

M gate lines;

N source lines;

a shift register circuit for driving the N source lines;

N first latch circuits electrically connected to the shift register circuit;

N second latch circuits, wherein an n-th second latch circuit (1≦n≦N, n is a natural number) of the N second latch circuits is electrically connected to an n-th first latch circuit of the N first latch circuits;

N second level shifter circuits, wherein an n-th second level shifter circuit of the N second level shifter circuits is electrically connected to the n-th second latch circuit;

a third latch circuit for holding a data signal of an (m−1)-th row (2≦m≦M, m is a natural number);

N exclusive disjunction circuits, wherein an n-th exclusive disjunction circuit of the N exclusive disjunction circuits is configured to compare a data signal of an m-th row with the data signal of the (m−1)-th row before the data signal of the m-th row is input to an n-th source line of the N source lines;

N first level shifter circuits, wherein an n-th first level shifter circuit of the N first level shifter circuits is electrically connected to the n-th exclusive disjunction circuit;

N buffer circuits, wherein an n-th buffer circuit of the N buffer circuits is electrically connected to the n-th second level shifter circuit and a power source circuit;

N first transmission gate circuits, wherein an n-th first transmission gate circuit of the N first transmission gate circuits is electrically connected to the n-th buffer circuit; and N second transmission gate circuits, the N second transmission gate circuits electrically connected to each other, wherein an n-th second transmission gate circuit of the N second transmission gate circuits is electrically connected to the n-th first level shifter circuit and electrically connected to the n-th source line, wherein the n-th source line is electrically connected to the n-th buffer circuit through the n-th first transmission gate circuit.

4. The display device according to claim 1, wherein the n-th source line is electrically connected to the power source circuit through a an n-th buffer circuit of N buffer circuits.

5. The display device according to claim 2, wherein the n-th source line is electrically connected to the power source circuit through a an n-th buffer circuit of N buffer circuits.

6. The display device according to claim 1, wherein each of the N circuits comprises a latch circuit and an exclusive disjunction circuit.

7. The display device according to claim 1, wherein the display device is a digital gray-scale display device.

8. The display device according claim 1, wherein line sequential driving is performed by the display device.

9. The display device according to claim 1, wherein the display device is an EL display device.

10. The display device according to claim 1, wherein the display device is a liquid crystal display device.

11. A method for driving a display device having M rows and N columns (M and N are natural numbers respectively) of pixels, M gate lines and N source lines, in which line sequential driving is performed comprising the steps of:

inputting a data signal of an (m−1)-th row (2≦m≦M, m is a natural number) to each of the N source lines;

electrically disconnecting the N source lines from a power source circuit;

comparing a data signal of an m-th row with the data signal of the (m−1)-th row before the data signal of the m-th row is input to the N source lines;

electrically connecting a first source line of the N source lines to a second source line of the N source lines when a data signal of an (m−1)-th row of the first source line is at high potential, a data signal of an m-th row of the first source line is at low potential, a data signal of an (m−1)-th row of the second source line is at low potential, and a data signal of an m-th row of the second source line is at high potential; and electrically disconnecting the connected first source line and second source line of the N source lines so that the data signal of the m-th row is input to each of the N source lines.

12. A method for driving a display device having M rows and N columns (M and N are natural numbers respectively) of pixels, M gate lines and N source lines, in which line sequential driving is performed comprising the steps of:

holding a data signal of an (m−1)-th row ($2 \leqq m \leqq M$, m is a natural number);

inputting the data signal of the (m−1)-th row to one of the N source lines;

comparing a data signal of an m-th row with the held data signal of the (m−1)-th row before the data signal of the m-th row is input to the one of the N source lines;

electrically disconnecting source lines to which a data signal of the m-th row is input from a power source circuit when the data signal of the m-th row is different from the data signal of the (m−1)-th row;

electrically connecting a first source line of the N source lines to a second source line of the N source lines when a data signal of an (m−1)-th row of the first source line is at high potential, a data signal of an m-th row of the first source line is at low potential, a data signal of an (m−1)-th row of the second source line is at low potential, and a data signal of an m-th row of the second source line is at high potential; and electrically disconnecting the connected first source line and second source line of the N source lines to be electrically connected to the power source circuit so that the data signal of the m-th row is input to the one of the N source lines.

13. The method for driving the display device according to claim 11, wherein an n-th source line ($1 \leqq n \leqq N$, n is a natural number) of the N source lines is electrically connected to the power source circuit through an n-th buffer circuit of N buffer circuits.

14. The method for driving the display device according to claim 11, wherein the data signal of the m-th row is compared with the data signal of the (m−1)-th row by an exclusive disjunction circuit.

15. The method for driving the display device according to claim 11, wherein charging or discharging is carried out in the first source line and the second source line by the step of electrically connecting the first source line to the second source line.

16. The method for driving the display device according to claim 11, wherein the display device is a digital gray-scale display device.

17. The method for driving the display device according to claim 12, wherein the data signal of an (m−1)-th row is held in a latch circuit.

18. The method for driving the display device according to claim 11, wherein the display device is an EL display device.

19. The method for driving the display device according to claim 11, wherein the display device is a liquid crystal display device.

20. The display device according to claim 2, wherein the display device is a digital gray-scale display device.

21. The display device according to claim 3, wherein the display device is a digital gray-scale display device.

22. The display device according to claim 2, wherein line sequential driving is performed by the display device.

23. The display device according to claim 3, wherein line sequential driving is performed by the display device.

24. The display device according to claim 2, wherein the display device is an EL display device.

25. The display device according to claim 3, wherein the display device is an EL display device.

26. The display device according to claim 2, wherein the display device is a liquid crystal display device.

27. The display device according to claim 3, wherein the display device is a liquid crystal display device.

28. The method for driving the display device according to claim 12, wherein an n-th source line ($1 \leqq n \leqq N$, n is a natural number) of the N source lines is electrically connected to the power source circuit through an n-th buffer circuit of N buffer circuits.

29. The method for driving the display device according to claim 12, wherein the data signal of the m-th row is compared with the data signal of the (m−1)-th row by an exclusive disjunction circuit.

30. The method for driving the display device according to claim 12, wherein charging or discharging is carried out in the first source line and the second source line by the step of electrically connecting the first source line to the second source line.

31. The method for driving the display device according to claim 12, wherein the display device is a digital gray-scale display device.

32. The method for driving the display device according to claim 12, wherein the display device is an EL display device.

33. The method for driving the display device according to claim 12, wherein the display device is a liquid crystal display device.

34. The method for driving the display device according to claim 11, wherein the data signal of an (m−1)-th row is held in a latch circuit.

* * * * *

UNITED STATES PATENT AND TRADEMARK OFFICE

CERTIFICATE OF CORRECTION

PATENT NO. : 7,616,182 B2
APPLICATION NO. : 11/269721
DATED : November 10, 2009
INVENTOR(S) : Tomoyuki Iwabuchi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this

Nineteenth Day of October, 2010

David J. Kappos

David J. Kappos
*Director of the United States Patent and Trademark Office*